(12) United States Patent
Hwang et al.

(10) Patent No.: US 10,849,078 B2
(45) Date of Patent: *Nov. 24, 2020

(54) METHOD AND TERMINAL FOR TRANSMITTING POWER HEADROOM REPORT IN DUAL CONNECTION BETWEEN TERMINAL AND BASE STATION

(71) Applicant: LG ELECTRONICS INC., Seoul (KR)

(72) Inventors: Daesung Hwang, Seoul (KR); Yunjung Yi, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/185,989

(22) Filed: Nov. 9, 2018

(65) Prior Publication Data

US 2019/0082397 A1    Mar. 14, 2019

Related U.S. Application Data

(63) Continuation of application No. 15/878,956, filed on Jan. 24, 2018, now Pat. No. 10,154,465, which is a
(Continued)

(51) Int. Cl.
*H04W 52/32* (2009.01)
*H04W 52/36* (2009.01)
(Continued)

(52) U.S. Cl.
CPC ..... *H04W 52/325* (2013.01); *H04W 52/0206* (2013.01); *H04W 52/34* (2013.01);
(Continued)

(58) Field of Classification Search
CPC .............. H04W 52/325; H04W 52/365
(Continued)

(56) References Cited

U.S. PATENT DOCUMENTS

2012/0120906 A1* 5/2012 Pan ............... H04L 1/0026
370/329
2012/0140743 A1* 6/2012 Pelletier ........... H04W 72/0453
370/335
(Continued)

FOREIGN PATENT DOCUMENTS

CN    101932087    12/2010
CN    102036294    4/2011
(Continued)

OTHER PUBLICATIONS

State Intellectual Property Office of the People's Republic of China Application Serial No. 201580022652.8, Office Action dated Apr. 25, 2019, 7 pages.
(Continued)

*Primary Examiner* — John J Lee
(74) *Attorney, Agent, or Firm* — Lee Hong Degerman Kang Waimey

(57) ABSTRACT

One disclosure of the present specification provides a method for receiving downlink data in a wireless communication system supporting 256 QAM. The method for receiving downlink data in a wireless communication system supporting 256 QAM comprises the steps of: receiving configuration information about power back-off; receiving downlink data transmitted on the basis of the configuration information about power back-off; and demodulating the received downlink data on the basis of the configuration information about power back-off, wherein the configuration information about power back-off may comprise information related to at least one of the following: whether to apply power back-off, the reduced amount of power of downlink
(Continued)

data by power back-off, a frame index to which power back-off is applied, a subframe index and a resource to which power back-off is applied.

6 Claims, 17 Drawing Sheets

Related U.S. Application Data continuation of application No. 15/661,869, filed on Jul. 27, 2017, now Pat. No. 9,918,286, which is a continuation of application No. 15/300,730, filed as application No. PCT/KR2015/003133 on Mar. 31, 2015, now Pat. No. 9,756,583.

(60) Provisional application No. 61/974,992, filed on Apr. 3, 2014, provisional application No. 62/002,187, filed on May 23, 2014, provisional application No. 62/034,793, filed on Aug. 8, 2014.

(51) Int. Cl.
*H04W 52/34* (2009.01)
*H04W 52/02* (2009.01)

(52) U.S. Cl.
CPC ........... *H04W 52/365* (2013.01); *Y02D 70/00* (2018.01); *Y02D 70/1242* (2018.01); *Y02D 70/1262* (2018.01); *Y02D 70/1264* (2018.01); *Y02D 70/23* (2018.01)

(58) Field of Classification Search
USPC ..................... 455/522, 69, 67.11, 452.1, 509
See application file for complete search history.

(56) References Cited

U.S. PATENT DOCUMENTS

| | | | |
|---|---|---|---|
| 2015/0271811 A1* | 9/2015 | Kim | H04W 52/146 370/329 |
| 2016/0183203 A1* | 6/2016 | Larsson | H04W 52/241 370/329 |
| 2017/0019864 A1 | 1/2017 | Hwang et al. | |
| 2017/0325181 A1 | 11/2017 | Hwang et al. | |
| 2018/0152901 A1 | 5/2018 | Hwang et al. | |

FOREIGN PATENT DOCUMENTS

| | | |
|---|---|---|
| CN | 102123437 | 7/2011 |
| WO | 2008155469 | 12/2008 |
| WO | 2011150361 | 12/2011 |

OTHER PUBLICATIONS

European Patent Office Application Serial No. 19163835.2, Search Report dated May 3, 2019, 8 pages.
European Patent Office Application Serial No. 15772364.4, Search Report dated Oct. 11, 2017, 7 pages.
Nokia, et al., "Further consideration on virtual PHR", 3GPP TSG RAN WG2 Meeting #71, R2-104394, Aug. 2010, 4 pages.
Panasonic, "Virtual power headroom report", 3GPP TSG RAN WG2 Meeting #71, R2-104502, Aug. 2010, 2 pages.
Japan Patent Office Application No. 2016-560648, Office Action dated Jan. 29, 2019, 2 pages.
Ericsson, "Introduction of dual connectivity in MAC", 3GPP TSG RAN WG2 Meeting #87, R2-143523, Aug. 2014, 25 pages.
Nokia, et al., "PHR for dual connectivity", 3GPP TSG RAN WG2 Meeting #87, R2-143364, Aug. 2014, 8 pages.
Catt, "Open issues on PHR in dual connectivity", 3GPP TSG RAN WG1 Meeting #78, R1-142887, Aug. 2014, 4 pages.
U.S. Appl. No. 15/300,730, Office Action dated Feb. 9, 2017, 11 pages.
Samsung, "Scheduling Information handling in inter-ENB carrier aggregation", 3GPP TSG-RAN WG2 Meeting #83bis, R2-133259, Sep. 27, 2013, 2 pages.
Panasonic, "Uplink transmission power management and PHR reporting for dual connectivity", 3GPP TSG-RAN WG2 Meeting #84, R2-133945, Nov. 1, 2013, 3 pages.
Ericsson, "Considerations on power control for Dual Connectivity", 3GPP TSG-RAN WG2 Meeting #84, R2-134234, Nov. 2, 2013, 4 pages.
Pantech, "UL transmission on dual connectivity", 3GPP TSG-RAN WG2 Meeting #82, R2-131802, May 11, 2013, 8 pages.

\* cited by examiner

METHOD AND TERMINAL FOR TRANSMITTING POWER HEADROOM REPORT IN DUAL CONNECTION BETWEEN TERMINAL AND BASE STATION

CROSS-REFERENCE TO RELATED APPLICATIONS

This application is a continuation of U.S. patent application Ser. No. 15/878,956, filed on Jan. 24, 2018, now U.S. Pat. No. 10,154,465, which is a continuation of U.S. patent application Ser. No. 15/661,869, filed on Jul. 27, 2017, now U.S. Pat. No. 9,918,286, which is a continuation of U.S. patent application Ser. No. 15/300,730, filed on Sep. 29, 2016, now U.S. Pat. No. 9,756,583, which is the National Stage filing under 35 U.S.C. 371 of International Application No. PCT/KR2015/003133, filed on Mar. 31, 2015, which claims the benefit of U.S. Provisional Application No. 61/974,992, filed on Apr. 3, 2014, 62/002,187, filed on May 23, 2014 and 62/034,793, filed on Aug. 8, 2014, the contents of which are all hereby incorporated by reference herein in their entirety.

BACKGROUND OF THE INVENTION

Field of the Invention

The present invention relates to mobile communication.

Related Art

The 3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", 3GPP LTE/LTE-A may divide the physical channel into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

Meanwhile, Power Headroom (PH) information of a terminal can be used to form a method for a base station to utilize resources of a terminal efficiently. Power control technology (or power adjustment technology) is an essential element for minimizing interference and reduce battery consumption of a terminal to achieve efficient distribution of resources in wireless communication. If a terminal provides PH information to a base station, the base station can estimate uplink maximum transmission power that a terminal can tolerate. Then the base station can provide uplink scheduling such as Transmit Power Control (TPC), Modulation and Coding Scheme (MCS), and bandwidth to the terminal within the estimated uplink maximum transmission power.

Also, a situation in which cells or cell groups at different geographic locations exchange signals or channels related to control and/or data can be taken into account in the next version of the system.

At this time, scheduling information among cells or cell groups at different geographic locations may not be shared dynamically but can be performed independently; in this case, transmission of each Uplink Control Information (UCI) to the corresponding dedicated cell can be taken into account.

In other words, transmitting UCI about a first base station (eNodeB1) to the first base station and transmitting UCI about a second base station (eNodeB2) to the second base station can be taken into account.

In this case, it can be described that duel connectivity has been established for a terminal connected to both of the first and the second base station.

However, in the case of dual connectivity, how a terminal transmits Power Headroom Reporting (PHR) to the first or the second base station is still left unsolved.

SUMMARY OF THE INVENTION

Accordingly, the disclosure of the specification has been made in an effort to solve the problem.

To achieve the objective described above, a method for transmitting PHR (Power Headroom Report) in a wireless communication system. The method may be performed by a terminal with dual connectivity to an MCG (Master Cell Group) and SCG (Secondary Cell Group). The method may comprise: triggering a PHR about a serving cell belonging to the MCG on the basis of a PHR triggering condition; and if the PHR is triggered, transmitting the PHR to a serving cell belonging to the MCG. The PHR may include PH (Power Headroom) information corresponding to an activated serving cell belonging to the SCG, and PH information corresponding to the activated serving cell belonging to the SCG is either virtual PH information or actual PH information determined on the basis of scheduling information of the terminal.

Also, the virtual PH information can be calculated on the basis of a predetermined reference format.

Also, the PHR triggering condition can include a first PHR triggering condition and a second PHR triggering condition. The first PHR triggering condition may includes a case in which the "prohibitPHR-Timer" is expired or has expired; a case in which a terminal secures uplink resources for new transmission; a case in which any one of activated serving cells configured for uplink has resources for uplink transmission, or PUCCH transmission exists in the corresponding cell after uplink data transmission through the uplink resources in the corresponding TTI or after the last PHT transmission is performed at the time of PUCCH transmission; and the case in which the change of power backoff request value (P-MPRc: Power Management Maximum Power Reduction) is larger than the "dl-Pathloss-Change" [dB] value after the last PHR transmission. The second PHR triggering condition may include a case in which the "prohibitPHT-Timer" is expired or has expired; a case in which a terminal has secures uplink resources for new transmission; and a case in which the path loss after the last PHR transmission has been performed is larger than the "dl-PathlossChange" [dB] value about at least one activated serving cell used as the path loss reference.

Also, PH information corresponding to an activated serving cell belonging to the SCG can be configured to have the virtual PH information in case the PHR is triggered according to the first PHR triggering condition.

Also, the virtual PH information can be transmitted together with $P_{CMAX,c}$ value which is the maximum transmission power of a terminal with respect to a serving cell c to which P-MPRc has been applied.

Also, the V field of PHR MAC can be configured to be 0.

Also, in case PH information corresponding to an activated serving cell belonging to the SCG is configured to have the virtual PH information, the first PHR triggering condition can be ignored.

Also, in case PH information corresponding to an activated serving cell belonging to the SCG is configured to have the virtual PH information, the second PHR triggering condition can be satisfied even when a terminal has not secured uplink resources for new transmission.

Also, whether the PHR is triggered according to the first PHR triggering condition can be determined through a higher layer signaling.

To achieve the objective described above, a terminal for transmitting PHR (Power Headroom Report) with dual connectivity to an MCG (Master Cell Group) and SCG (Secondary Cell Group) in a wireless communication system. The terminal may comprise: an RF unit; and a processor for triggering PHR about a serving cell belonging to the MCG according to PHR triggering conditions. If the PHR is triggered, the processor controls the RF unit to transmit the PHR to the serving cell belonging to the MCG, wherein the PHR includes PH (Power Headroom) information corresponding to an activated serving cell belonging to the SCG, and PH information corresponding to the activated serving cell belonging to the SCG is either virtual PH information or actual PH information determined on the basis of scheduling information of the terminal.

To achieve the objective described above, a method for transmitting transmit PHR (Power Headroom Report) in a wireless communication system. The method may be performed by a terminal with dual connectivity to a first and a second cell group. The method may comprise: receiving configuration information of PH (Power Headroom) corresponding to an activated serving cell belonging to the second cell group; and in case conditions for triggering PHR are satisfied, generating the PHR and transmitting the generated PHR to a serving cell belonging to the first cell group, wherein the PHR can be configured to include either of virtual PH information about an activated serving cell belonging to the second cell group based on configuration information of the received PH and actual PH information determined on the basis of scheduling information of the terminal.

At this time, the first cell group can be an MCG (Master Cell Group), and the second cell group can be an SCG (Secondary Cell Group).

Also, the conditions for triggering PHR can include the first PHR triggering condition and the second triggering condition.

Also, the PHR can include the virtual PH information in case the PHR is triggered according to the first PHR condition.

Also, in case the PHR is configured to include the virtual PH information, the first PHR triggering condition can be ignored.

Also, in case the PHR is configured to include the virtual PH information, the second PHR triggering condition can be satisfied even when a terminal has not secured uplink resources for new transmission.

According to the disclosure of the present specification, the aforementioned problem in the prior art can be solved. More specifically, according to the disclosure of the present specification, a terminal with dual connectivity can perform PHR transmission efficiently by applying virtual PH information according to scheduling and PHR triggering conditions.

DESCRIPTION OF EXEMPLARY EMBODIMENTS

Figure 1:
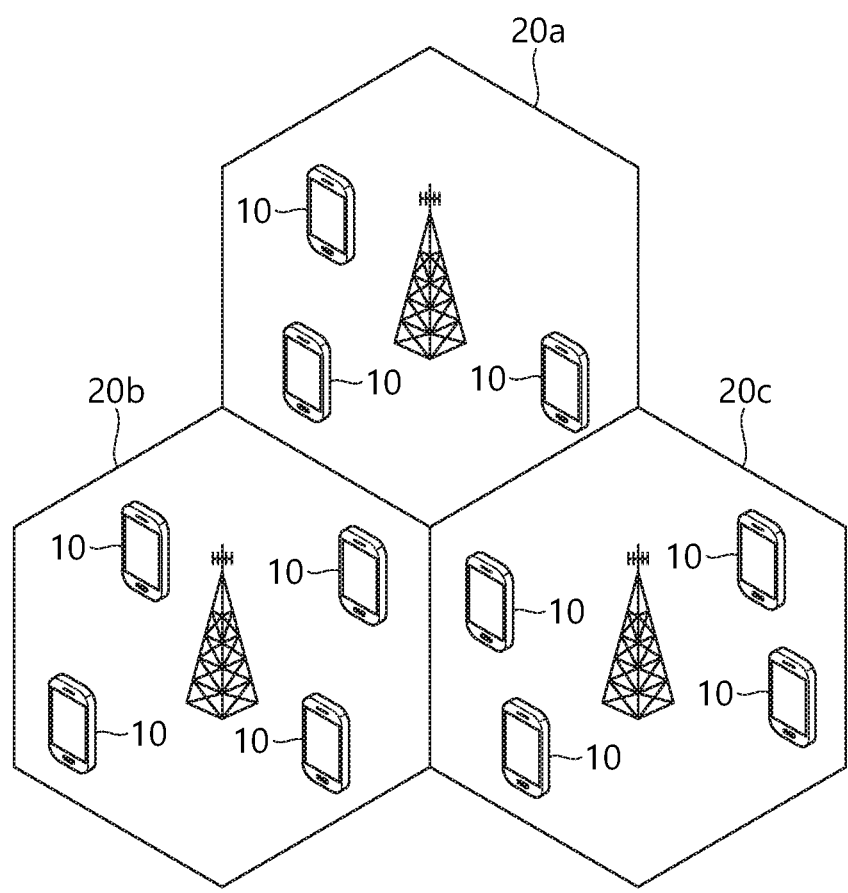
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
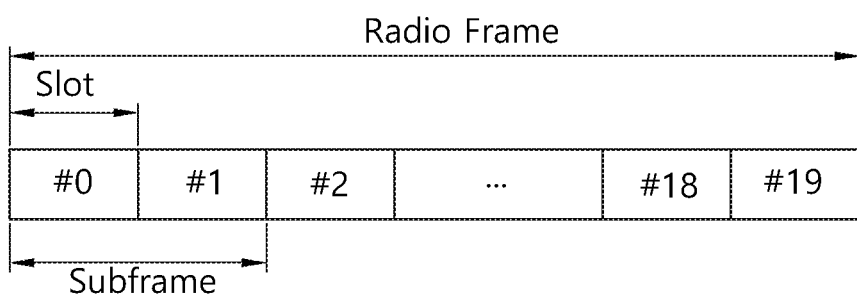
FIG. 2 illustrates a structure of a radio frame according to frequency division duplex (FDD) of 3rd generation partnership project (3GPP) long term evolution (LTE).

FIG. 2 illustrates a structure of a radio frame according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 subframes indexed 0 to 9. One subframe includes two consecutive slots. Accordingly, the radio frame includes 20 slots. The time taken for one subframe to be transmitted is denoted TTI (transmission time interval). For example, the length of one subframe may be 1 ms, and the length of one slot may be 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
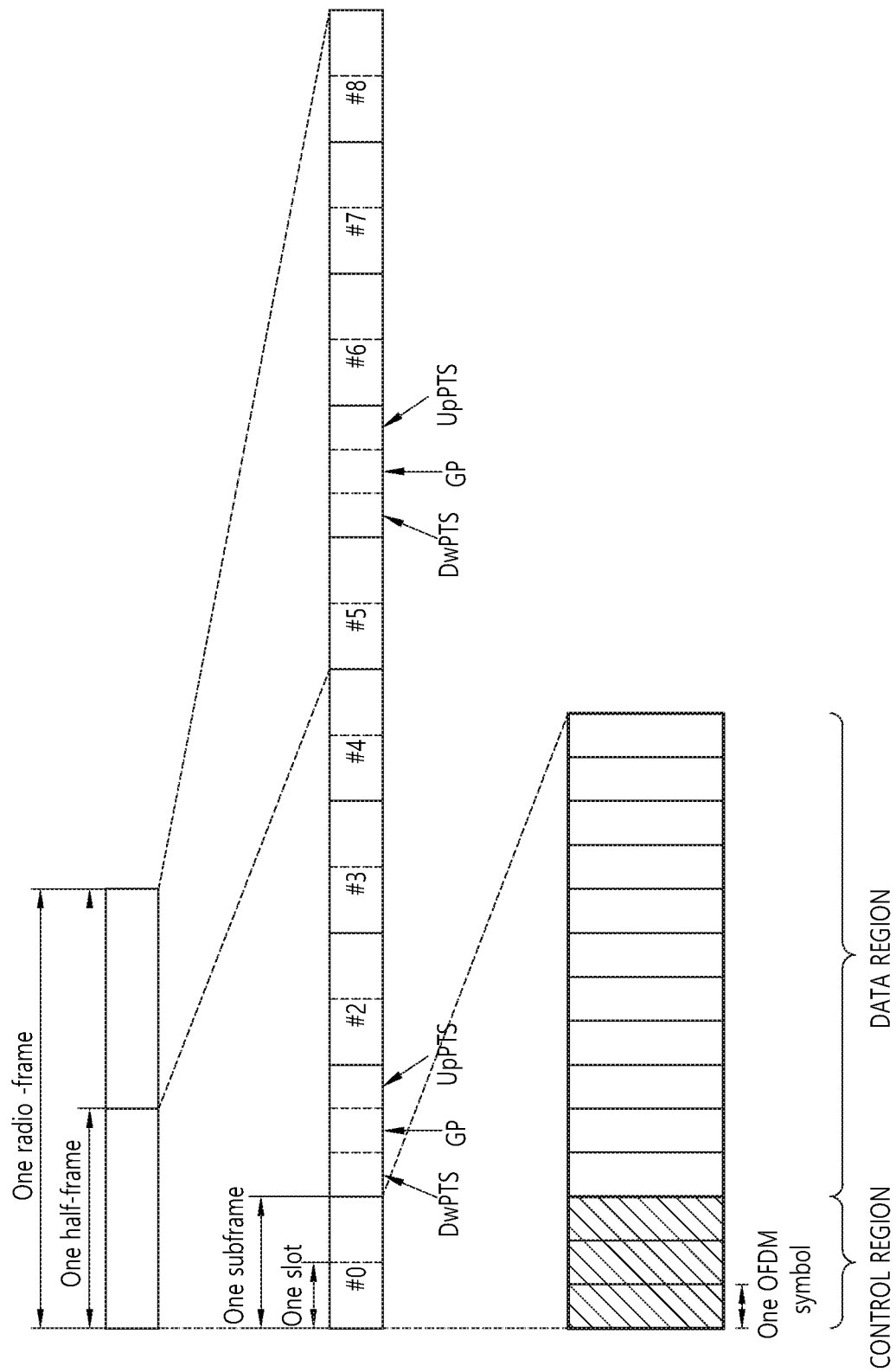
FIG. 3 illustrates a structure of a downlink radio frame according to time division duplex (TDD) in 3GPP LTE.

FIG. 3 illustrates a structure of a downlink radio frame according to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Subframes having index #1 and index #6 are denoted special subframes, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) subframe and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' a UL subframe, and 'S' a special subframe. When receiving a UL-DL configuration from the base station, the terminal may be aware of whether a subframe is a DL subframe or a UL subframe according to the configuration of the radio frame.

Figure 4:
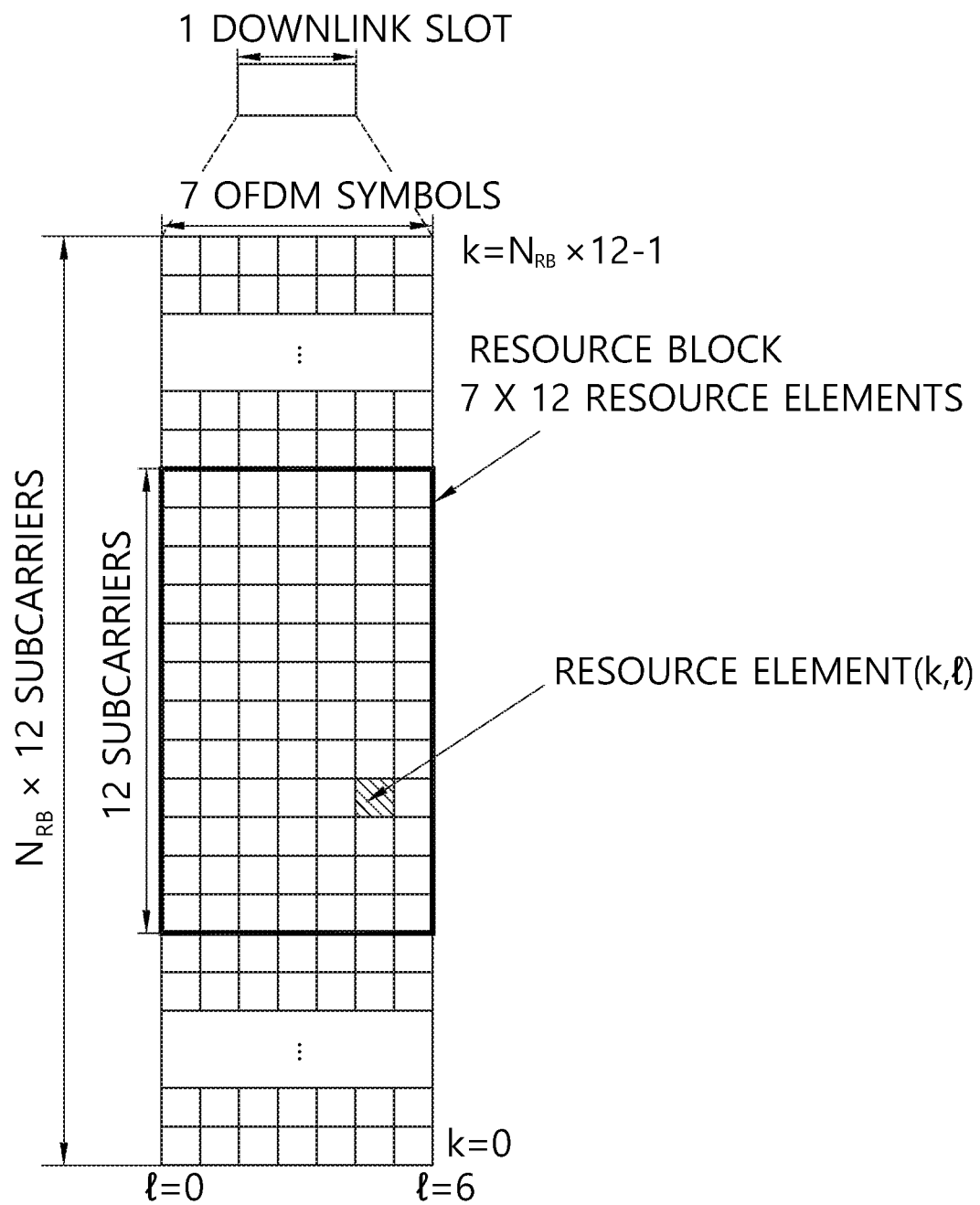
FIG. 4 illustrates an example of a resource grid for one uplink or downlink slot in 3GPP LTE.

FIG. 4 illustrates an example of a resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Figure 5:
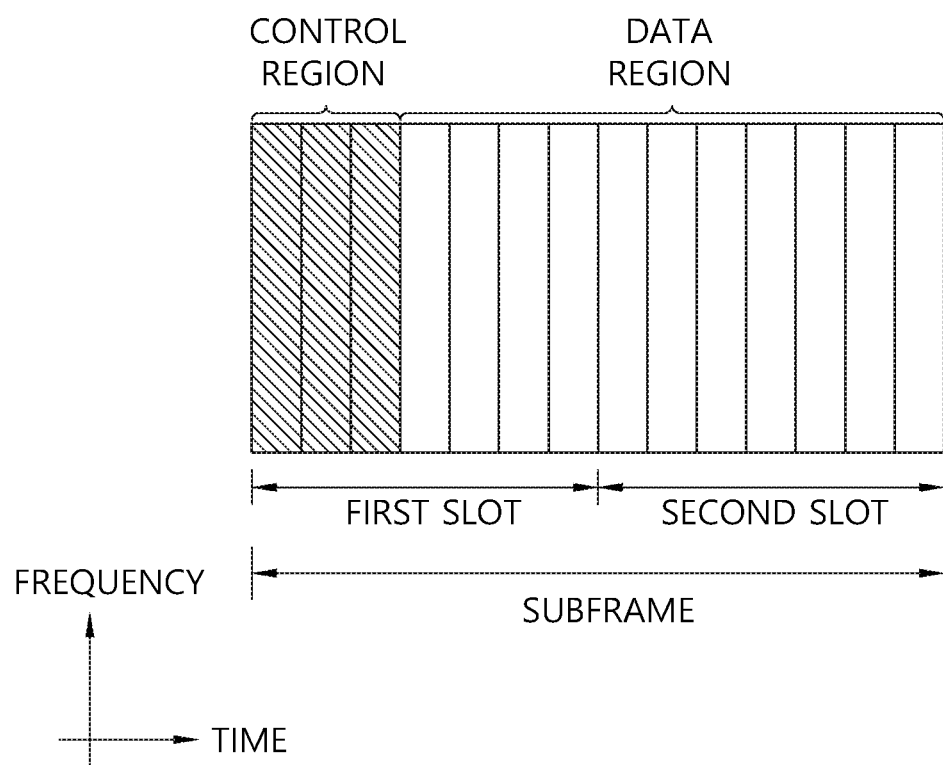
FIG. 5 illustrates a structure of a downlink subframe.

FIG. 5 illustrates a structure of a downlink subframe.

In FIG. 5, assuming the normal CP, one slot includes seven OFDM symbols, by way of example.

The DL (downlink) subframe is split into a control region and a data region in the time domain. The control region includes up to first three OFDM symbols in the first slot of the subframe. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the subframe carries CIF (control format indicator) regarding the number (i.e., size of the control region) of OFDM symbols used for transmission of control channels in the subframe. The wireless device first receives the CIF on the PCFICH and then monitors the PDCCH.

Unlike the PDCCH, the PCFICH is transmitted through a fixed PCFICH resource in the subframe without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first subframe of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

Figure 6:
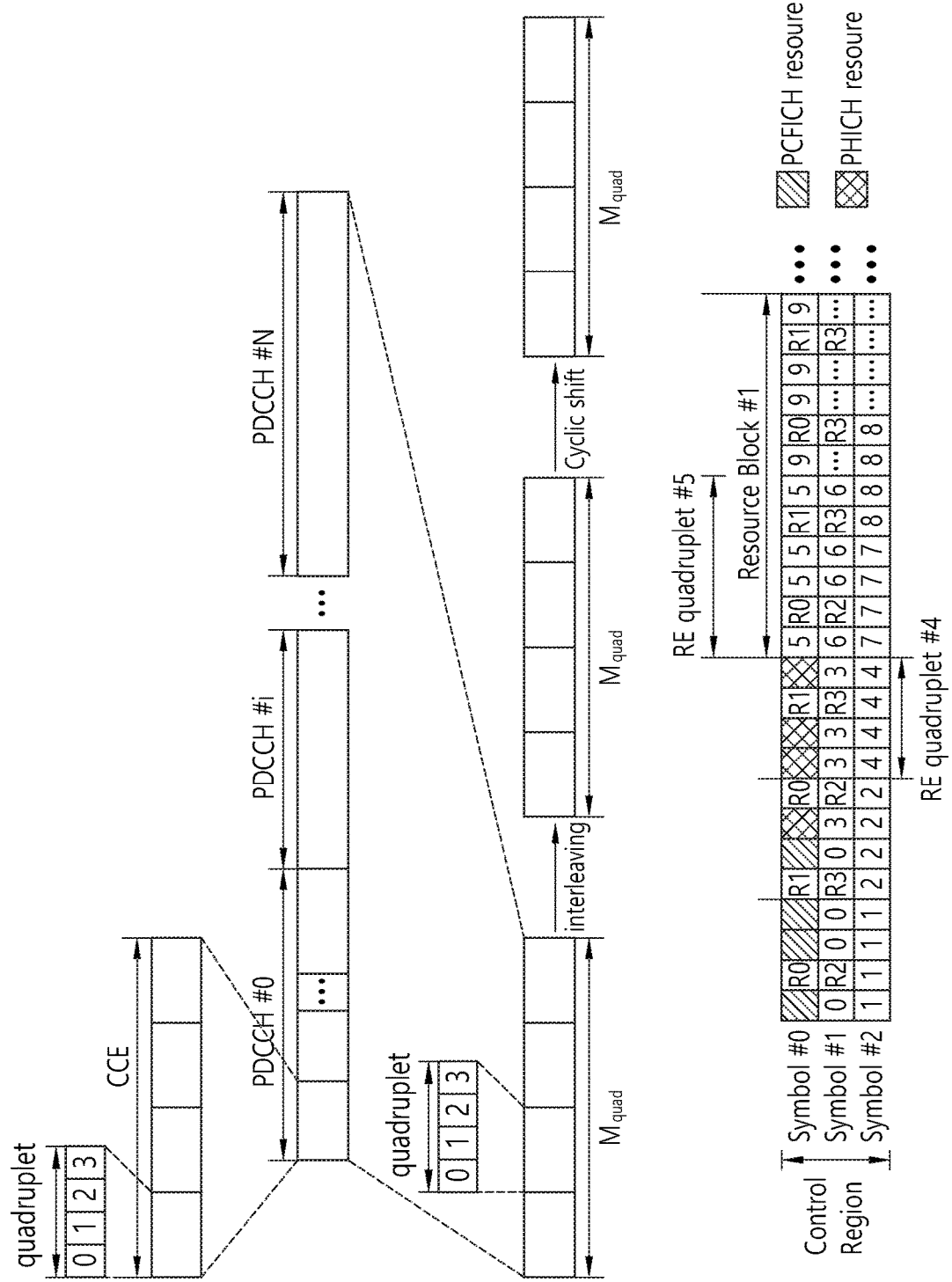
FIG. 6 illustrates an example of resource mapping of a PDCCH.

FIG. 6 illustrates an example of resource mapping of a PDCCH.

R0 denotes a reference signal of a 1st antenna, R1 denotes a reference signal of a 2nd antenna, R2 denotes a reference signal of a 3rd antenna, and R3 denotes a reference signal of a 4th antenna.

A control region in a subframe includes a plurality of control channel elements (CCEs). The CCE is a logical allocation unit used to provide the PDCCH with a coding rate depending on a state of a radio channel, and corresponds to a plurality of resource element groups (REGs). The REG includes a plurality of resource elements (REs). According to the relationship between the number of CCEs and the coding rate provided by the CCEs, a PDCCH format and a possible PDCCH bit number are determined.

A BS determines the number of CCEs used in transmission of the PDCCH according to a channel state. For example, a UE having a good DL channel state may use one CCE in PDCCH transmission. A UE having a poor DL channel state may use 8 CCEs in PDCCH transmission.

One REG (indicated by a quadruplet in the drawing) includes 4 REs. One CCE includes 9 REGs. The number of CCEs used to configure one PDCCH may be selected from {1, 2, 4, 8}. Each element of {1, 2, 4, 8} is referred to as a CCE aggregation level.

A control channel consisting of one or more CCEs performs interleaving in unit of REG, and is mapped to a physical resource after performing cyclic shift based on a cell identifier (ID).

Figure 7:
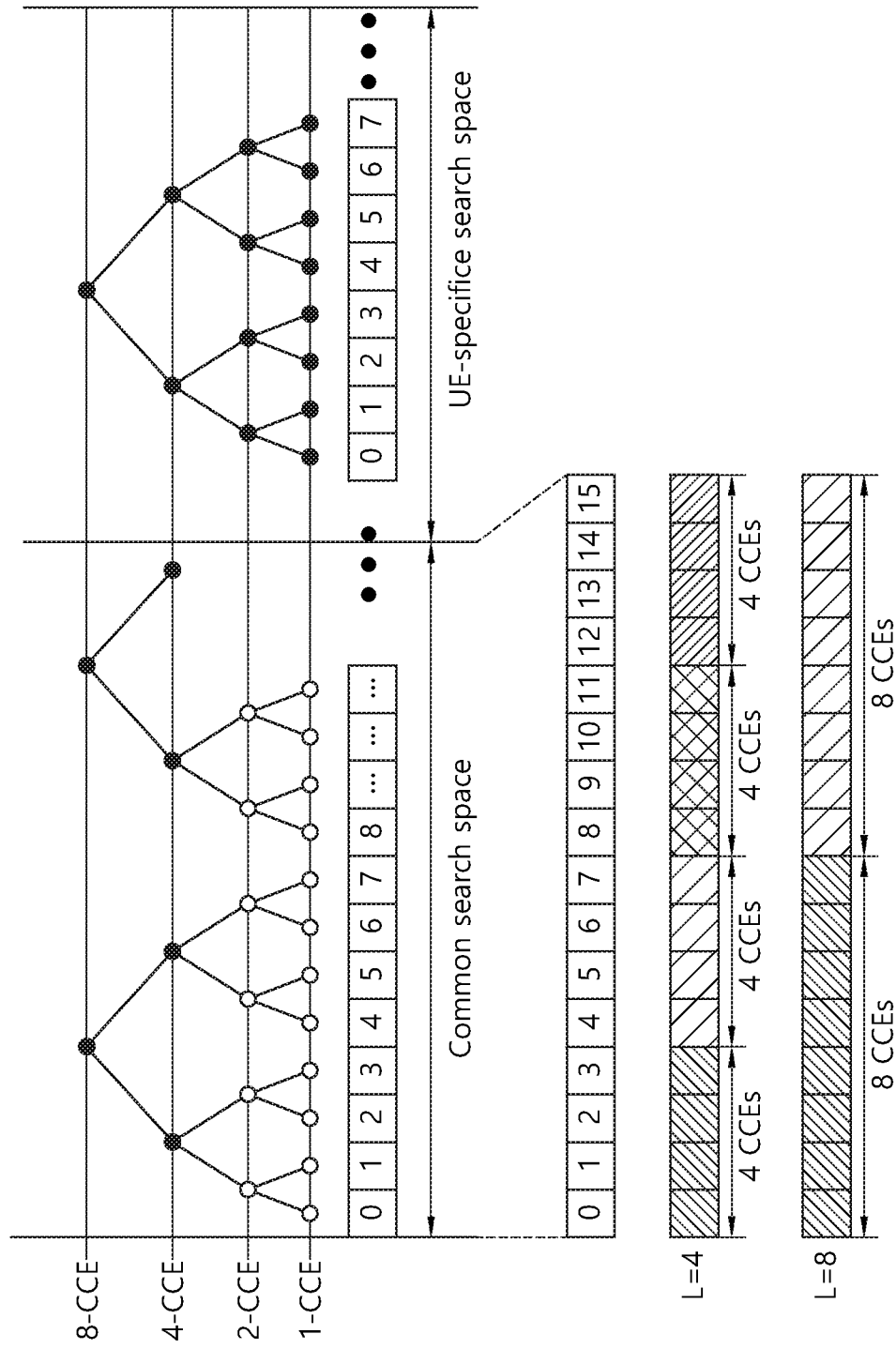
FIG. 7 illustrates an example of monitoring of a PDCCH.

FIG. 7 illustrates an example of monitoring of a PDCCH.

A UE cannot know about a specific position in a control region in which its PDCCH is transmitted and about a specific CCE aggregation or DCI format used for transmission. A plurality of PDCCHs can be transmitted in one subframe, and thus the UE monitors the plurality of PDCCHs in every subframe. Herein, monitoring is an operation of attempting PDCCH decoding by the UE according to a PDCCH format.

The 3GPP LTE uses a search space to reduce an overhead of blind decoding. The search space can also be called a monitoring set of a CCE for the PDCCH. The UE monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A) for carrying UE-specific information can also be transmitted in the common search space. The UE-specific search space supports a PDCCH having a CCE aggregation level of {1, 2, 4, 8}.

Table 2 below shows the number of PDCCH candidates monitored by a wireless device.

TABLE 2

| Type | Search space S(L) k Aggregation level L | Size [in CCEs] | Number M(L) of PDCCH candidates |
|---|---|---|---|
| UE-specific | 1 | 6 | 6 |
| | 2 | 12 | 6 |

TABLE 2-continued

| Type | Search space S(L) k Aggregation level L | Size [in CCEs] | Number M(L) of PDCCH candidates |
|---|---|---|---|
| | 4 | 8 | 2 |
| | 8 | 16 | 2 |
| Common | 4 | 16 | 4 |
| | 8 | 16 | 2 |

A size of the search space is determined by Table 2 above, and a start point of the search space is defined differently in the common search space and the UE-specific search space. Although a start point of the common search space is fixed irrespective of a subframe, a start point of the UE-specific search space may vary in every subframe according to a UE identifier (e.g., C-RNTI), a CCE aggregation level, and/or a slot number in a radio frame. If the start point of the UE-specific search space exists in the common search space, the UE-specific search space and the common search space may overlap with each other.

In a CCE aggregation level $L \in \{1,2,3,4\}$, a search space S(L)k is defined as a set of PDCCH candidates. A CCE corresponding to a PDCCH candidate m of the search space S(L)k is given by Equation 1 below.

$$L\{(Y_k+m')\bmod \lfloor N_{CCE,k}/L \rfloor\}+i \qquad \text{[Equation 2]}$$

Herein, i=0, 1, . . . , L−1, m=0, . . . , M(L)−1, and NCCE,k denotes the total number of CCEs that can be used for PDCCH transmission in a control region of a subframe k. The control region includes a set of CCEs numbered from 0 to NCCE,k−1. M(L) denotes the number of PDCCH candidates in a CCE aggregation level L of a given search space.

If a carrier indicator field (CIF) is configured for the wireless device, m'=m+M(L)ncif. Herein, ncif is a value of the CIF. If the CIF is not configured for the wireless device, m'=m.

In a common search space, Yk is set to 0 with respect to two aggregation levels L=4 and L=8.

In a UE-specific search space of the aggregation level L, a variable Yk is defined by Equation 2 below.

$$Y_k=(A \cdot Y_{k-1})\bmod D \qquad \text{[Equation 3]}$$

Herein, Y−1=nRNTI≠0, A=39827, D=65537, k=floor(ns/2), and ns denotes a slot number in a radio frame.

When the UE monitors the PDCCH by using the C-RNTI, a search space and a DCI format used in monitoring are determined according to a transmission mode of the PDSCH.

Meanwhile, when the UE monitors the PDCCH by using the C-RNTI, a search space and a DCI format used in monitoring are determined according to a transmission mode (TM) of the PDSCH. Table 3 below shows an example of PDCCH monitoring for which the C-RNTI is configured.

TABLE 3

| Transmission mode | DCI format | Search space | Transmission mode of PDSCH according to PDCCH |
|---|---|---|---|
| Transmission mode 1 | DCI format 1A | Public service and terminal specific | Single antenna port, port 0 |
| | DCI format 1 | Terminal specific | Single antenna port, port 0 |
| Transmission mode 2 | DCI format 1A | Public service and terminal specific | Transmit diversity |
| | DCI format 1 | Terminal specific | Transmit diversity |
| Transmission mode 3 | DCI format 1A | Public service and terminal specific | Transmit diversity |
| | DCI format 2A | Terminal specific | CDD(Cyclic Delay Diversity) or transmit diversity |

TABLE 3-continued

| Transmission mode | DCI format | Search space | Transmission mode of PDSCH according to PDCCH |
|---|---|---|---|
| Transmission mode 4 | DCI format 1A | Public service and terminal specific | Transmit diversity |
| | DCI format 2 | Terminal specific | Closed-loop spatial multiplexing |
| Transmission mode 5 | DCI format 1A | Public service and terminal specific | Transmit diversity |
| | DCI format 1D | Terminal specific | MU-MIMO(Multi-user Multiple Input Multiple Output) |
| Transmission mode 6 | DCI format 1A | Public service and terminal specific | Transmit diversity |
| | DCI format 1B | Terminal specific | Closed-loop spatial multiplexing |
| Transmission mode 7 | DCI format 1A | Public service and terminal specific | If the number of PBCH transmisison ports is 1, single antenna port, port 0. Otherwise, transmit diversity |
| | DCI format 1 | Terminal specific | Single antenna port, port 5 |
| Transmission mode 8 | DCI format 1A | Public service and terminal specific | If the number of PBCH transmisison ports is 1, single antenna port, port 0. Otherwise, transmit diversity |
| | DCI format 2B | Terminal specific | Dual layer transmisison (port 7 or 8), or single antenna port, port 7 or 8 |
| Transmission mode 9 | DCI format 1A | Public service and terminal specific | Non-MBSFN sub-frame: if the number of PBCH antenna ports is 1, port 0 is used as independent antenna port. Otherwise, transmit Diversity MBSFN sub-frame: port 7 as independent antenna port |
| | DCI format 2C | Terminal specific | 8 transmisison layers, ports 7-14 are used or port 7 or 8 is used as independent antenna port |
| Transmission mode 10 | DCI 1A | Public service and terminal specific | Non-MBSFN sub-frame: if the number of PBCH antenna ports is 1, port 0 is used as independent antenna port. Otherwise, transmit Diversity MBSFN sub-frame: port 7 as independent antenna port |
| | DCI format 2D | Terminal specific | 8 transmisison layers, ports 7-14 are used or port 7 or 8 is used as independent antenna port |

The usage of the DCI format is classified as shown in table below.

TABLE 4

| DCI format | Contents |
|---|---|
| DCI format 0 | Used in PUSCH scheduling |
| DCI format 1 | Used in scheduling of one PDSCH codeword |
| DCI format 1A | Used in compact scheduling of one PDSCH codeword and random access process |
| DCI format 1B | Used in compact scheduling of one PDSCH codeword having precoding information |
| DCI format 1C | Used in very compact scheduling of one PDSCH codeword |
| DCI format 1D | Used in precoding and compact scheduling of one PDSCH codeword having power offset information |
| DCI format 2 | Used in PDSCH scheduling of terminals configured in closed-loop spatial multiplexing mode |
| DCI format 2A | Used in PDSCH scheduling of terminals configured in open-loop spatial multiplexing mode |
| DCI format 2B | DCI format 2B is used for resouce allocation for dual-layer beam-forming of PDSCH. |
| DCI format 2C | DCI format 2C is used for resouce allocation for closed-loop SU-MIMO or MU-MIMO operation to 8 layers. |
| DCI format 2D | DCI format 2C is used for resouce allocation to 8 layers. |
| DCI format 3 | Used to transmit TPC command of PUCCH and PUSCH having 2 bit power adjustments |
| DCI format 3A | Used to transmit TPC command of PUCCH and PUSCH having 1 bit power adjustment |
| DCI format 4 | Used in PUSCH scheduling of uplink (UP) operated in multi-antenna port transmisison mode |

Figure 8:
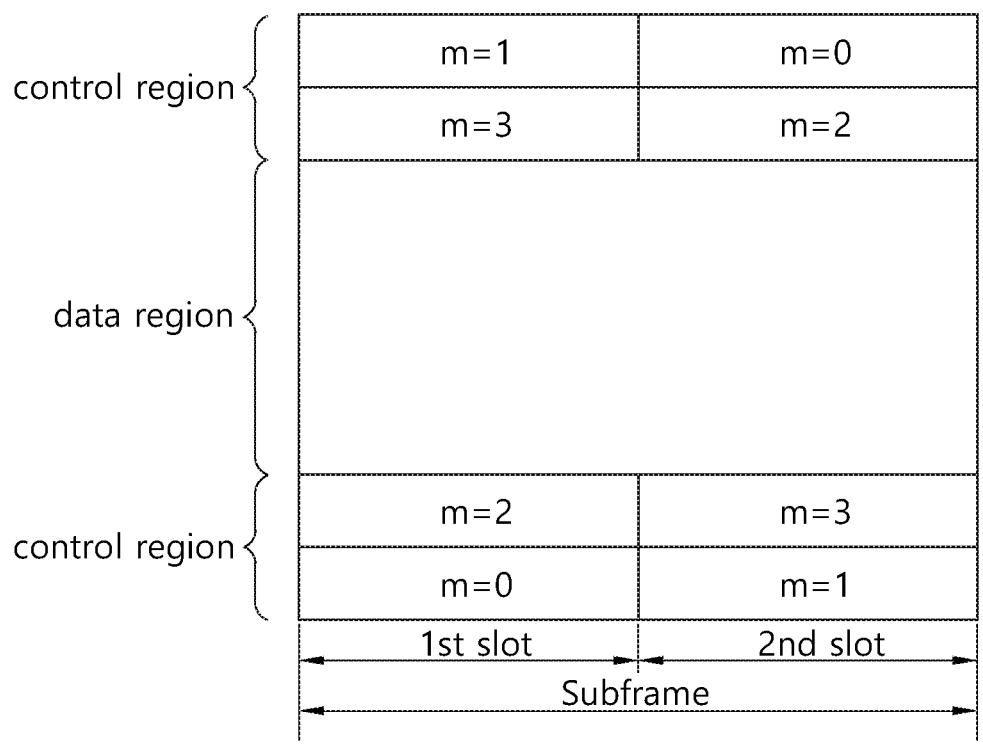
FIG. 8 illustrates the architecture of a UL sub-frame in 3GPP LTE.

FIG. 8 illustrates the architecture of a UL sub-frame in 3GPP LTE.

Referring to FIG. 8, the uplink sub-frame may be separated into a control region and a data region in the frequency domain. The control region is allocated a PUCCH (physical uplink control channel) for transmission of uplink control information. The data region is allocated a PUSCH (physical uplink shared channel) for transmission of data (in some cases, control information may also be transmitted).

The PUCCH for one user equipment is allocated in resource block (RB) pair in the sub-frame. The resource blocks in the resource block pair take up different sub-carriers in each of the first and second slots. The frequency occupied by the resource blocks in the resource block pair allocated to the PUCCH is varied with respect to a slot boundary. This is referred to as the RB pair allocated to the PUCCH having been frequency-hopped at the slot boundary. A frequency diversity gain may be obtained by transmitting uplink control information through different sub-carriers over time.

Since the UE transmits UL control information over time through different subcarriers, a frequency diversity gain can be obtained. In the figure, m is a location index indicating a logical frequency-domain location of the RB pair allocated to the PUCCH in the sub-frame.

Uplink control information transmitted on the PUCCH may include a HARQ ACK/NACK, a channel quality indicator (CQI) indicating the state of a downlink channel, a scheduling request (SR) which is an uplink radio resource allocation request, and the like.

The PUSCH is mapped to a uplink shared channel (UL-SCH), a transport channel Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provided an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

Figure 9:
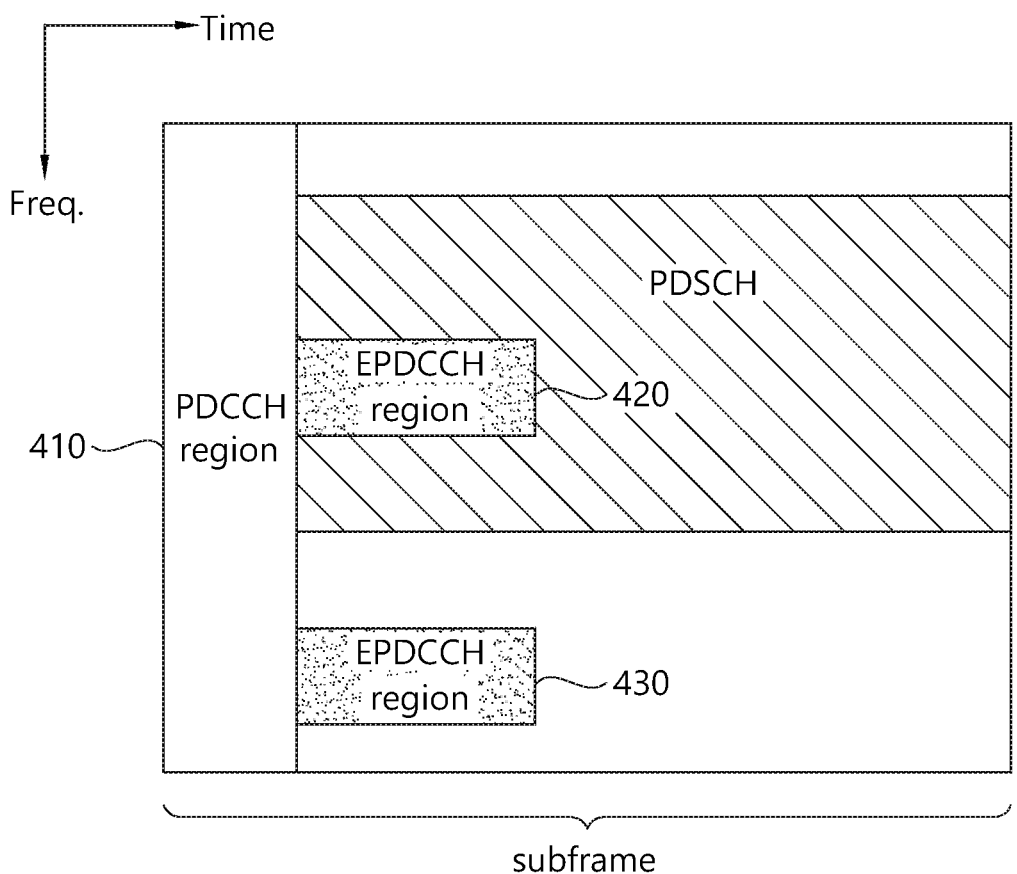
FIG. 9 illustrates a subframe having an EPDCCH.

FIG. 9 illustrates a subframe having an EPDCCH.

A subframe may include a zero or one PDCCH region 410 or zero or more EPDCCH regions 420 and 430.

The EPDCCH regions 420 and 430 are regions in which a wireless device monitors an EPDCCH. The PDCCH region 410 is located in up to four front OFDM symbols of a subframe, while the EPDCCH regions 420 and 430 may flexibly be scheduled in OFDM symbols after the PDCCH region 410.

One or more EPDCCH regions 420 and 430 may be designated for the wireless device, and the wireless devices may monitor an EPDCCH in the designated EPDCCH regions 420 and 430.

The number/location/size of the EPDCCH regions 420 and 430 and/or information on a subframe for monitoring an EPDCCH may be provided by a base station to a wireless device through an RRC message or the like.

In the PDCCH region 410, a PDCCH may be demodulated based on a CRS. In the EPDCCH regions 420 and 430, a demodulation (DM) RS may be defined, instead of a CRS, for demodulation of an EPDCCH. An associated DM RS may be transmitted in the corresponding EPDCCH regions 420 and 430.

An RS sequence rns(m) for the associated DM RS is represented by Equation 3.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{[Equation 4]}$$

Here, m=0, 1, . . . , $2N_{maxRB}-1$, $N_{maxRB}$ denotes the maximum number of RBs, ns denotes the number of a slot in a radio frame, and l denotes the number of an OFDM symbol in a slot.

A pseudo-random sequence c(i) is defined by the following gold sequence with a length of 31.

Here, m=0, 1, . . . , $12_{RB}-1$, and $N_{RB}$ denotes the maximum number of RBs. A pseudo-random sequence generator may be initialized as $c_{init}=(\text{floor}(ns/2)+1)(2N_{EPDCCH,ID}+1)2^{16}+n_{EPDCCH,SCID}$ in each starting subframe. ns is the number of a slot in a radio frame, $N_{EPDCCH,ID}$ is a value associated with an EPDCCH set, which is given through a higher-layer signal, and $n_{EPDCCH,SCID}$ is a specific value.

The EPDCCH regions 420 and 430 may be used for scheduling for different cells, respectively. For example, an EPDCCH in the EPDCCH region 420 may carry scheduling information for a primary cell, and an EPDCCH in the EPDCCH region 430 may carry scheduling information for a secondary cell.

When EPDCCHs are transmitted in the EPDCCH regions 420 and 430 through multiple antennas, the same precoding as for the EPDCCHs may be applied to DM RSs in the EPDCCH regions 420 and 430.

Comparing with a CCE used as a transmission resource unit for a PDCCH, a transmission resource unit for an EPDCCH is an enhanced control channel element (ECCE). An aggregation level may be defined as a resource unit for monitoring an EPDCCH. For example, defining one ECCE as a minimum resource for an EPDCCH, an aggregation level may be defined as L={1, 2, 4, 8, 16}.

Hereinafter, an EPDCCH search space may correspond to an EPDCCH region. In an EPDCCH search space, one or more EPDCCH candidates may be monitored by one or more aggregation levels.

Hereinafter, resource allocation for an EPDCCH will be described.

An EPDCCH is transmitted using one or more ECCEs. An ECCE includes a plurality of enhanced resource element groups (EREGs). An ECCE may include four EREGs or eight EREGs according to a subframe type based on a TDD DL-UL configuration and a CP. For example, an ECCE may include four EREGs in a normal CP, while an ECCE may include eight EREGs in an extended CP.

A physical resource block (PRB) pair refers to two PRBs having the same RB number in one subframe. A PRB pair refers to a first PRB of a first slot and a second PRB of a second slot in the same frequency domain. In a normal CP, a PRB pair includes 12 subcarriers and 14 OFDM symbols and thus includes 168 REs.

Figure 10:
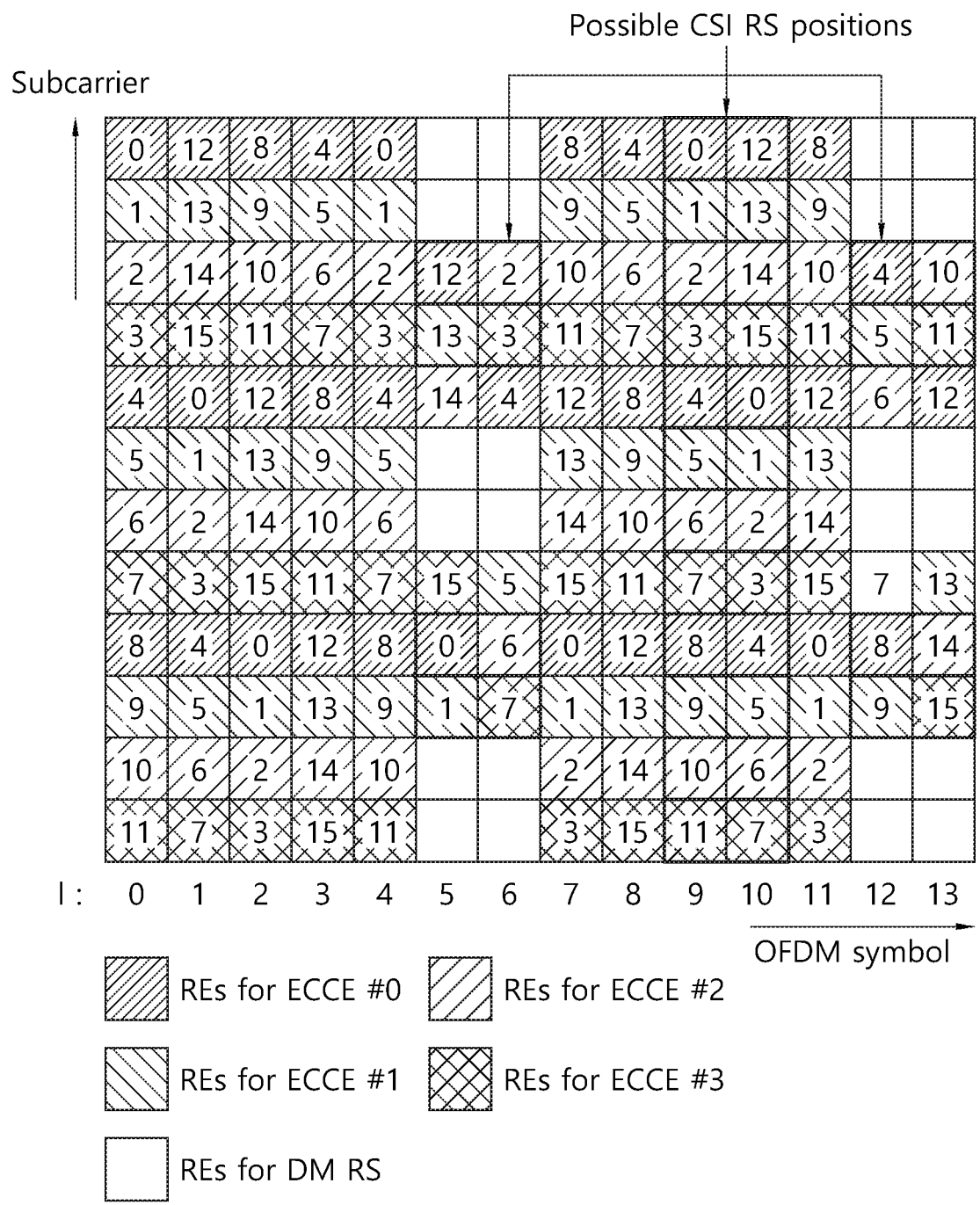
FIG. 10 illustrates an example of a PRB pair.

FIG. 10 illustrates an example of a PRB pair.

Although it is shown below that a subframe includes two slots and a PRB pair in one slot includes seven OFDM symbols and 12 subcarriers, these numbers of OFDM symbols and subcarriers are provided for illustrative purposes only.

In one subframe, a PRB pair includes 168 REs. 16 EREGs are formed from 144 Res, excluding 24 REs for a DM RS. Thus, one EREG may include nine REs. Here, a CSI-RS or CRS may be disposed in one PRB pair in addition the DM RM. In this case, the number of available REs may be reduced and the number of REs included in one EREG may be reduced. The number of REs included in an EREG may change, while the number of EREGs included in one PRB pair, 16, does not change.

Here, as illustrated in FIG. 10, REs may sequentially be assigned indexes, starting from a top subcarrier in a leftmost OFDM symbol (l=0) (or REs may sequentially be assigned indexes in an upward direction, starting from a bottom subcarrier in the leftmost OFDM symbol (l=0)). Suppose that 16 EREGs are assigned indexes from 0 to 15. Here, nine REs having RE index 0 are allocated to EREG 0. Likewise, nine REs having RE index k (k=0, . . . , 15) are allocated to EREG k.

A plurality of EREGs is combined to define an EREG group. For example, an EREG group including four EREGs may be defined as follows: EREG group #0={EREG 0, EREG 4, EREG 8, EREG 12}, EREG group #1={EREG 1, EREG 5, EREG 9, EREG 3}, EREG group #2={EREG 2, EREG 6, EREG 10, EREG 14}, and EREG group #3={EREG 3, EREG 7, EREG 11, EREG 15}. An EREG group including eight EREGs may be defined as follows: EREG group #0={EREG 0, EREG 2, EREG 4, EREG 6, EREG 8, EREG 10, EREG 12, EREG 14} and EREG group #1={EREG 1, EREG 3, EREG 5, EREG 7, EREG 9, EREG 11, EREG 13, EREG 15}.

As described above, an ECCE may include four EREGs, and an ECCE may include eight EREGs in an extended CP. An ECCE is defined by an ERGE group. For example, FIG. 6 shows that ECCE #0 includes EREG group #0, ECCE #1 includes EREG group #1, ECCE #2 includes EREG group #2, and ECCE #3 includes EREG group #3.

There are localized transmission and distributed transmission in ECCE-to-EREG mapping. In localized transmission, an EREG group forming one ECCE is selected from EREGs in one PRB pair. In distributed transmission, an EREG group forming one ECCE is selected from EREGs in different PRB pairs.

Figure 11:
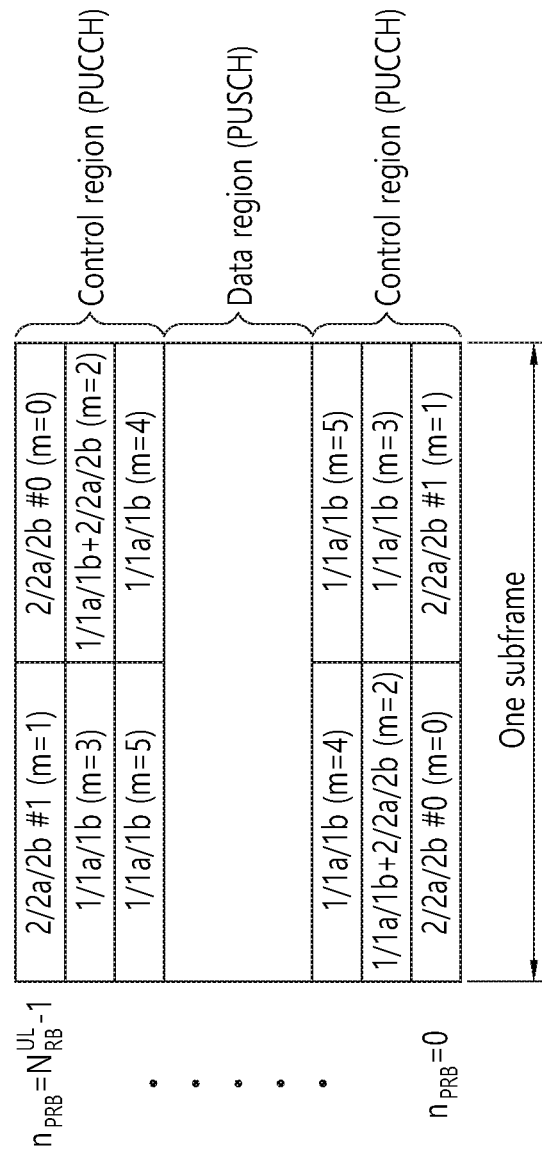
FIG. 11 illustrates a PUCCH and a PUSCH on an uplink subframe.

FIG. 11 illustrates a PUCCH and a PUSCH on an uplink subframe.

Uplink control information (UCI) may be transmitted to the PUCCH. In this case, the PUCCH transmits various types of control information according to a format. The UCI includes a HARQ ACK/NACK, a scheduling request (SR), and channel status information (CSI) representing a downlink channel status.

PUCCH format 1 transmits a scheduling request (SR). In this case, an on-off keying (OOK) scheme may be applied. PUCCH format 1a transmits an acknowledgement/non-acknowledgment (ACK/NACK) modulated by a binary phase shift keying (BPS K) scheme with respect to one codeword. PUCCH format 1b transmits an ACK/NACK modulated by a quadrature phase shift keying (QPSK) scheme with respect to two codewords. PUCCH format 2 transmits a channel quality indicator (CQI) modulated by the QPSK scheme. PUCCH formats 2a and 2b transport the CQI and the ACK/NACK.

Table 5 illustrates the PUCCH formats.

TABLE 5

| Format | Description |
|---|---|
| Format 1 | Scheduling request (SR) |
| Format 1a | ACK/NACK of 1 bit HARQ, Scheduling request (SR) may exist or not |
| Format 1b | ACK/NACK of 2 bit HARQ, Scheduling request (SR) may exist or not |
| Format 2 | CSI (20 code bits) |
| Format 2 | In the case of extended CP, CSI and HARQ ACK/NACK of 1 bit or 2 bits |
| Format 2a | CSI and HARQ ACK/NACK of 1 bit |
| Format 2b | CSI and HARQ ACK/NACK of 2 bits |
| Format 3 | A plurality of ACK/NACKs for carrier aggregation |

Each PUCCH format is mapped in the PUCCH to be transmitted. For example, the PUCCH formats 2/2a/2b are mapped in the resource block (m=0, 1 in FIG. 7) of a band edge allocated to the UE to be transmitted. A mixed PUCCH resource block (RB) may be mapped in a resource block (for example, m=2) adjacent to the resource block to which the PUCCH formats 2/2a/2b are allocated in a central direction of the band to be transmitted. The PUCCH formats 1/1a/1b to which the SR and the ACK/NACK are transmitted may be disposed in a resource block of m=4 or m=5. The number N(2)RB of resource blocks which may be used in the PUCCH formats 2/2a/2b to which the CQI is transmitted may be indicated to the UE through a broadcasted signal.

The aforementioned CSI is an index representing a status of the DL channel, and may include at least one of a channel quality indicator (CQI) and a precoding matrix indicator (PMI). Further, a precoding type indicator (PTI), a rank indication (RI), and the like may be included.

The CQI provides information on link adaptive parameters which may be supported by the UE for a predetermined time. The CQI may indicate a data rate which may be supported by the DL channel by considering a characteristic of the UE receiver, a signal to interference plus noise ratio (SINR), and the like. The base station may determine modulation (QPSK, 16-QAM, 64-QAM, and the like) to be applied to the DL channel and a coding rate by using the CQI. The CQI may be generated by various methods. For example, the various methods include a method of quantizing and feed-backing the channel status as it is, a method of calculating and feed-backing a signal to interference plus noise ratio (SINR), a method of notifying a status which is actually applied to the channel such as a modulation coding scheme (MCS), and the like. When the CQI is generated based on the MCS, the MCS includes a modulation scheme, a coding scheme, and a coding rate according to the coding scheme, and the like.

The PMI provides information on a precoding matrix in precoding based on a code book. The PMI is associated with the multiple input multiple output (MIMO). The feed-backing of the PMI in the MIMO may be called a closed loop MIMO.

The RI is information on the number of layers recommended by the UE. That is, the RI represents the number of independent streams used in spatial multiplexing. The RI is fed-back only in the case where the UE operates in an MIMO mode using the spatial multiplexing. The RI is always associated with one or more CQI feed-backs. That is, the fed-back CQI is calculated by assuming a predetermined RI value. Since the rank of the channel is generally changed slower than the CQI, the RI is fed-back less than the number of CQIs. A transmission period of the RI may be a multiple of the CQI/PMI transmission period. The RI is defined in the entire system band, and a frequency-selective RI feedback is not supported.

As such, the PUCCH is used only in the transmission of the UCI. To this end, the PUCCH support multiple formats. A PUCCH having different bit numbers for each subframe may be used according to a modulation scheme subordinate to the PUCCH format.

Meanwhile, the illustrated PUSCH is mapped in an uplink shared channel (UL-SCH) which is a transmission channel Uplink data transmitted on the PUSCH may be a transmission block which is a data block for the UL-SCH transmitted during the TTI. The transmission block may include user data. Alternatively, the uplink data may be multiplexed data. The multiplexed data may be acquired by multiplexing the transmission block for the UL-SCH and the channel status information. For example, the channel status information (CSI) multiplexed in the data may include the CQI, the PMI, the RI, and the like. Alternatively, the uplink data may be constituted by only the uplink status information. Periodic or aperiodic channel status information may be transmitted through the PUSCH.

The PUSCH is allocated by the UL grant on the PDCCH. Although not illustrated, a fourth OFDM symbol of each slot of the normal CP is used in the transmission of a demodulation reference signal (DM RS) for the PUSCH.

A carrier aggregation system is now described.

Figure 12:
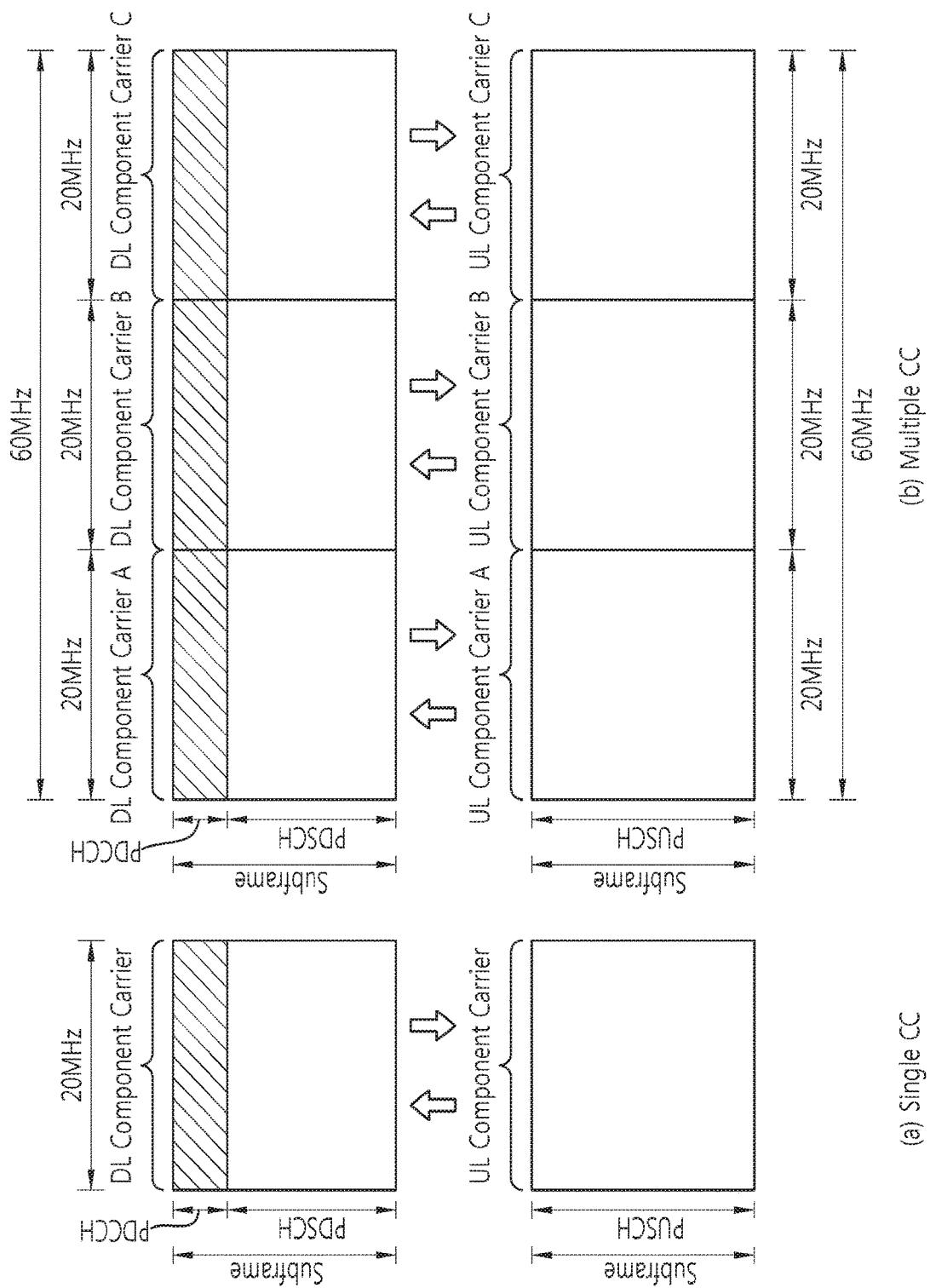
FIG. 12 illustrates an example of comparison between a single carrier system and a carrier aggregation system.

FIG. 12 illustrates an example of comparison between a single carrier system and a carrier aggregation system.

Referring to FIG. 12, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

The PCC (primary component carrier) means a component carrier (CC) corresponding to the primary cell. The PCC is, among several CCs, the one where the terminal initially achieves connection or RRC connection with the base station. The PCC is a special CC that is in charge of connection or RRC connection for signaling regarding multiple CCs and manages terminal context information (UE context) that is connection information related with the terminal. Further, the PCC achieves connection with the terminal, so that the PCC is always left in the activation state when in RRC connected mode. The downlink component carrier corresponding to the primary cell is denoted downlink primary component carrier (DL PCC) and the uplink component carrier corresponding to the primary cell is denoted uplink primary component carrier (UL PCC).

The SCC (secondary component carrier) means a CC corresponding to a secondary cell. That is, the SCC is a CC other than the PCC, which is assigned to the terminal and is an extended carrier for the terminal to perform additional resource allocation in addition to the PCC. The SCC may be left in activation state or deactivation state. The downlink component carrier corresponding to the secondary cell is denoted downlink secondary component carrier (DL SCC) and the uplink component carrier corresponding to the secondary cell is denoted uplink secondary component carrier (UL SCC).

The primary cell and the secondary cell have the following characteristics.

First, the primary cell is used for transmitting a PUCCH. Second, the primary cell is always left activated while the secondary cell may be activated/deactivated depending on a specific condition. Third, when the primary cell experiences a radio link failure (hereinafter, 'RLF'), RRC re-connection is triggered. Fourth, the primary cell may be varied by a handover procedure that comes with an RACH (random access channel) procedure or by altering a security key. Fifth, NAS (non-access stratum) information is received through the primary cell. Sixth, in the FDD system, the primary cell has always a pair of a DL PCC and a UL PCC. Seventh, a different component carrier (CC) may be set as a primary cell in each terminal. Eighth, the primary cell may be replaced only through a handover or cell selection/cell re-selection procedure. In adding a new serving cell, RRC signaling may be used to transmit system information of a dedicated serving cell.

When configuring a serving cell, a downlink component carrier may form one serving cell or a downlink component carrier and an uplink component carrier form a connection to thereby configure one serving cell. However, a serving cell is not configured with one uplink component carrier alone.

Activation/deactivation of a component carrier is equivalent in concept to activation/deactivation of a serving cell. For example, assuming that serving cell 1 is constituted of DL CC1, activation of serving cell 1 means activation of DL CC1. If serving cell2 is configured by connection of DL CC2 and UL CC2, activation of serving cell2 means activation of DL CC2 and UL CC2. In this sense, each component carrier may correspond to a serving cell.

The number of component carriers aggregated between uplink and downlink may vary. When the number of downlink CCs is the same as the number of uplink CCs is denoted symmetric aggregation, and when the numbers differ from each other is denoted asymmetric aggregation. Further, the sizes (i.e., bandwidth) of CCs may be different from each other. For example, when five CCs are used to configure a 70 MHz band, the configuration may be made as follows: 5 MHz CC(carrier #0)+20 MHz CC(carrier #1)+20 MHz CC(carrier #2)+20 MHz CC(carrier #3)+5 MHz CC(carrier #4).

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 13:
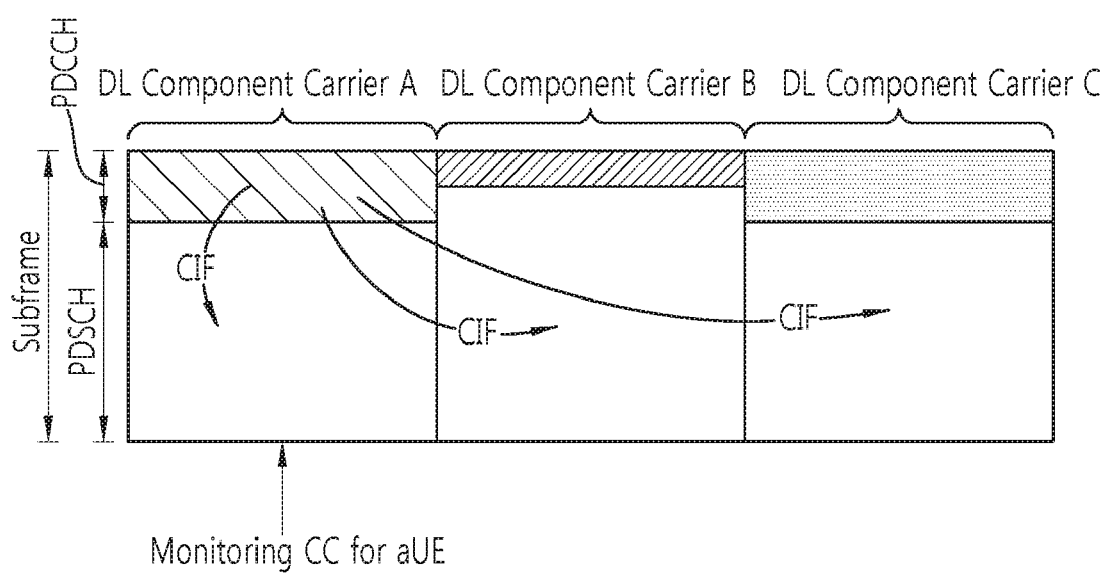
FIG. 13 exemplifies cross-carrier scheduling in the carrier aggregation system.

FIG. 13 exemplifies cross-carrier scheduling in the carrier aggregation system.

Referring to FIG. 13, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 13 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

Figure 14:
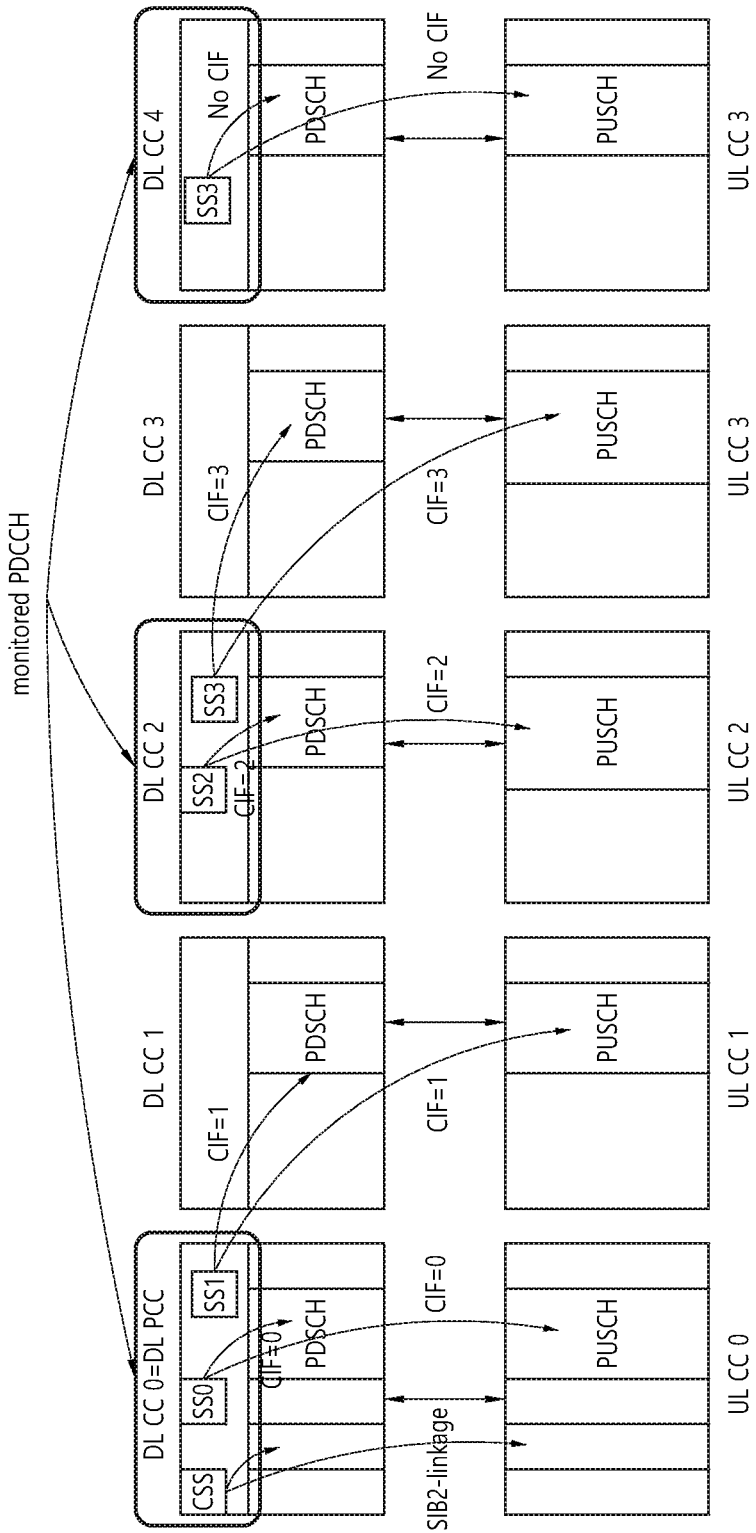
FIG. 14 illustrates an example of scheduling performed when cross-carrier scheduling is configured in a cross-carrier scheduling.

FIG. 14 illustrates an example of scheduling performed when cross-carrier scheduling is configured in a cross-carrier scheduling.

Referring to FIG. 14, DL CC 0, DL CC 2, and DL CC 4 belong to a PDCCH monitoring DL CC set. The user equipment searches for DL grants/UL grants for DL CC 0 and UL CC 0 (UL CC linked to DL CC 0 via SIB 2) in the CSS of DL CC 0. The user equipment searches for DL grants/UL grants for DL CC 1 and UL CC 1 in SS 1 of DL CC 0. SS 1 is an example of USS. That is, SS 1 of DL CC 0 is a space for searching for a DL grant/UL grant performing cross-carrier scheduling.

In what follows, Power Headroom (PH) will be described.

PH refers to extra power that can be used in addition to the power being used currently for a terminal to perform uplink transmission. For example, suppose the maximum transmission power allowed for a terminal to perform uplink transmission is 10 W, and the terminal is consuming 9 W within a frequency band of 10 MHz. Then since additional power of 1 W is available for the terminal, PH becomes 1 W.

At this time, if a base station allocates a frequency band of 20 MHz to the terminal, 18 W (=9 W×2) is needed. However, since the maximum power of the terminal is 10 W, if 20 MHz is allocated to the terminal, the terminal may either be unable to use the whole frequency band or the base station may not be able to receive a signal of the terminal properly due to lack of power. To remedy the aforementioned problem, the terminal can report to the base station that PH is 1 W, by which the base station can perform scheduling within the PH allowed. The report performed as described above is called Power Headroom Report (PHR).

Through a PHR procedure, a terminal can transmit the following information to a serving base station: 1) information about a difference between the maximum transmission power and estimated UL-SCH (PUSCH) transmission power of a nominal terminal for each activated serving cell, 2) information about a difference between the maximum transmission power allowed for a terminal in a primary serving cell and estimated PUCCH transmission power, or 3) information about a difference between the maximum transmission power allowed in the primary serving cell, estimated UL-SCH, and PUCCH transmission power.

A terminal can have two types of PHR (type 1 and type 2). PH of an arbitrary terminal can be defined for a subframe i with respect to a serving cell c.

1. Type 1 of Power Headroom Report (PHR) (Type 1 PH)

Type 1 PH includes: 1) a case in which a terminal transmits a PUSCH without involving a PUCCH, 2) a case in which a terminal transmits a PUCCH and a PUSCH simultaneously, and 3) a case in which a PUSCH is not employed for transmission.

First, in case a terminal transmits a PUSCH without involving a PUCCH for a subframe i with respect to a serving cell c, the power headroom for type 1 report can be expressed by the following mathematical equation.

$$PH_{type1,c}(i)=P_{CMAX,c}(i)-\{10 \log_{10}(M_{PUSCH,c}(i))+P_{O\_PUSCH,c}(j)+\alpha_c(j)\cdot PL_c+\Delta\Delta_{TF,c}(i)+f_c(i)\} \text{ [dB]}, \quad \text{[Equation 5]}$$

where $P_{CMAX,c}(i)$ represents a terminal's maximum transmission power with respect to a serving cell c, and $\hat{P}_{CMAX,c}(i)$ represents the maximum transmission power converted into a decibel value [dB].

In the mathematical equation above, $P_{CMAX,c}(i)$ is the maximum transmission power of a terminal obtained by applying offset values set by the network according to the maximum transmission power obtained by the smaller of $P_{EMAX}$ value determined on the basis of P-max value transmitted to a terminal by a base station through RRC signaling and $P_{PowerClass}$ value determined according to transmission power class determined by the hardware level of each terminal. At this time, the offset values can be the maximum power reduction (MPR) value, additional maximum power reduction (A-MPR) value, or power management maximum power reduction (P-MPR) value; and can optionally be an offset value ($\Delta T_C$) applied according to a frequency band highly influenced by filter characteristics within a transmission unit of a terminal.

Different from $P_{CMAX}(i)$, the $P_{CMAX,c}(i)$ is the value applied only for a serving cell c. Accordingly, the P-max value is obtained as the value $P_{EMAX,c}$ applied only for the serving cell c, and each of the offset values is also obtained by the value applied only for the serving cell c. In other words, those values are obtained as $MPR_c$, $A-MPR_c$, $P-MPR_c$, and $\Delta T_{C,c}$. However, the $P_{PowerClass}$ value is calculated by using the same value as used for calculation for each terminal.

Also, $M_{PUSCH,c}(i)$ represents the bandwidth of resources to which a PUSCH is allocated in a subframe i with respect to a serving cell c, expressed in terms of the number of RBs.

Also, $P_{O_{PUSCH},c}(j)$ is the sum of $$P_{0_{NOMINAL_{PUSCH}},c}(j)$$

and $P_{0\_UE\_PUSCH,c}(j)$ with respect to a serving cell c, and the index j in the higher layer is 0 or 1. In the case of semi-persistent grant PUSCH transmission (or re-transmission), j is 0 while, in the case of dynamically scheduled grant) PUSCH transmission (or re-transmission), j is 2. Also, in the case of random access response grant PUSCH transmission (or re-transmission), j is 2. Also, in the case of random access response grant PUSCH transmission (or re-transmission), $P_{0\_UE\_PUSCH,c}(2)$ is 0, and $P_{0\_NOMINAL\_PUSCH,c}(2)$ is the sum of $P_{0\_PRE}$ and $\Delta_{PREAMBLE\_Msg3}$. At this time, the parameter $P_{0\_PRE}$ (preambleInitialReceivedTargetPower) and $\Delta_{PREAMBLE\_Msg3}$ is signaled from the higher layer.

If j is 0 or 1, a 3-bit parameter provided by the higher layer can be used to select one of $\alpha_c \in \{0, 0.4, 0.5, 0.6, 0.7, 0.8, 0.9, 1\}$ values. In case j is 2, $\alpha_c(j)$ is always 1.

$PL_c$ is an estimated value of downlink path loss (PL) with respect to a serving cell c calculated by a terminal, expressed in dBs, and can be obtained from "referenceSignalPower–higher layer filtered RSRP". At this time, referenceSignalPower is the value provided by the higher layer, which is the EPRE (Energy Per Resource Element) value of a downlink reference signal, expressed in units of dBm. RSRP (Reference Signal Received Power) is a received power value of a reference signal with respect to a reference serving cell. pathlossReferenceLinking, a higher layer parameter, is used to determine a serving cell selected as a reference serving cell, referenceSignalPower used for calculation of the $PL_c$, and higher layer filtered RSRP. At this time, the reference serving cell configured by the pathlossReferenceLinking can be a primary serving cell or a DL SCC of the corresponding secondary serving cell configured for an SIB2 connection with a UL CC.

Also, $\Delta TF$, c(i) is a parameter for reflecting the effect caused by the MCS (Modulation Coding Scheme), which has a value of $10 \log_{10}((2^{BPRE\cdot K_S}-1)\cdot \beta_{offset}^{PUSCH})$. At this time, $K_S$ is a deltaMCS-Enabled parameter provided by the higher layer with respect to each serving cell c, which has the value of 1.25 or 0. In particular, in the case of transmission mode 2 for transmit diversity, $K_S$ is always 0. Also, in case only control information is transmitted through PUSCH without UL-SCH data, $BPRE=O_{CQI}/N_{RE}$, and for other cases, $$BPRE = \sum_{r=0}^{C-1} K_r/N_{RE},$$

where C is the number of code blocks, $K_r$ represents the size of a code block, $O_{CQI}$ represents the number of CQI/PMI bits including the number of CRC bits, and $N_{RE}$ represents the number of determined resource elements (namely, $N_{RE}=M_{sc}^{PUSCH\text{-}initial} \cdot N_{symb}^{PUSCH\text{-}initial}$). Also, in case only the control information is transmitted through PUSCH without UL-SCH data, $\beta_{offset}^{PUSCH}=\beta_{offset}^{CQI}$, and for other cases, $\beta_{offset}^{PUSCH}$ is always set to 1.

Also, $\delta_{PUSCH,c}$ is a correction value and is determined according to a TPC command specified in the DCI format 0 or DCI format 4 with respect to a serving cell c or a TPC command within the DCI format 3/3A transmitted being encoded together with other terminals. In the DCI format 3/3A, CRC parity bits are scrambled with TPC-PUSCH-RNTI; therefore, only those terminals to which the RNTI value is allocated can recognize the DCI format 3/3A. At this time, in case a terminal belongs to a plurality of serving cells, different RNTI values can be allocated to the respective serving cells for identification of the serving cells. At this time, the adjustment condition of PUSCH power control with respect to a current serving cell c is described by $f_c(i)$, and in case accumulation is activated by the higher layer with respect to a serving cell c or in case PDCCH includes the DCI format 0 in which the TPC command $\delta_{PUSCH,c}$ is scrambled by a temporary-C-RNTI, "$f_c(i)=f_c(i-1)+\delta_{PUSCH,c}(i-K_{PUSCH})$". At this time, $\delta_{PUSCH,c}(i-K_{PUSCH})$ is a TPC command belonging to the DCI format 0/4 or 3/3A within the PDCCH transmitted through the $(i-K_{PUSCH})$-th subframe, and $f_c(0)$ is the first value after accumulation reset. Also, $K_{PUSCH}$ value is 4 in the case of FDD. In the presence of PDCCH scheduling PUSCH transmission through the subframe 2 or 7 when TDD UL/DL configuration is 0, if the LSB (Least Significant Bit) of UL index within the DCI format 0/4 within the PDCCH is set to 1, $K_{PUSCH}$ is 7.

Second, if a terminal transmits PUCCH and PUSCH simultaneously through subframe i with respect to a serving cell c, type 1 PH is expressed by the following mathematical equation.

$$PH_{type1,c}(i)=\tilde{P}_{CMAX,c}(i)-\{10\log_{10}(M_{PUSCH,c}(i))+P_{O\_PUSCH,c}(j)+\alpha_c(j)\cdot PL_c+\Delta_{TF,c}(i)+f_c(i)\} \text{ [dB]} \quad \text{[Equation 6]}$$

where $\tilde{P}_{CMAX,c}(i)$ is calculated under the assumption that the subframe i performs PUSCH transmission only. In this case, the physical layer delivers $\tilde{P}_{CMAX,c}(i)$ to the higher layer instead of delivering $P_{CMAX,c}(i)$.

Third, in case a terminal does not transmit PUSCH through the subframe i with respect to a serving cell c, type 1 PH can be expressed as follows.

$$PH_{type1,c}(i)=\tilde{P}_{CMAX,c}(i)-\{P_{O\_PUSCH,c}(1)+\alpha_c(1)\cdot PL_c+f_c(i)\} \text{ [dB]} \quad \text{[Equation 7]}$$

where $\tilde{P}_{CMAX,c}(i)$ is calculated under the assumption that MPR is 0 dB, A-MPR is 0 dB, P-MPR is 0 dB, and $\Delta T_C$ is 0 dB.

2. Type 2 of Power Headroom Report (PHR) (Type 2 PH)

Type 2 PH includes: 1) a case in which a terminal transmits PUCCH and PUSCH simultaneously through a subframe i with respect to a primary serving cell, 2) a case in which a terminal transmits a PUCCH without PUSCH, and 3) a case in which PUCCH or PUSCH is not transmitted.

First, in case a terminal transmits PUCCH and PUSCH simultaneously through the subframe i with respect to a primary serving cell, type 2 PH is calculated by the following mathematical equation.

$$PH_{type2}(i) = P_{CMAX,c}(i) - 10\log_{10}\left( \begin{array}{l} 10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{0\_PUCCH}+PL_c+h(n_{CQI},n_{HARQ},n_{SR})+\Delta_{F\_PUCCH}(F)+\Delta_{TxD}(F')+g(i))/10} \end{array} \right) \text{[dB]} \quad \text{[Equation 8]}$$

where $\Delta_{F_{PUCCH}}(F)$ is defined in the higher layer (RRC), and each $\Delta_{F_{PUCCH}}(F)$ value coincides with the PUCCH format (F) related to the PUCCH format 1a. Each PUCCH format (F) is described in the table below.

TABLE 6

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |
| 3 | QPSK | 48 |

If a terminal is set up by the higher layer to comprise two antenna ports for PUCCH transmission, the higher layer provides $\Delta_{TxD(F')}$ value for each PUCCH format F'. Otherwise, $\Delta_{TxD(F')}$ is always 0.

Also, h(nCQI, nHARQ, nSR) has a different value for each PUCCH format. At this time, nCQI represents the number of bits of CQI (Channel Quality Information). If SR (Scheduling Request) is configured for the subframe i, and a transmission block related to UL-SCH of the terminal does not configured to handle SR, nSR=1, but nSR=0, otherwise. If the terminal belongs to one serving cell, nHARQ represents the number of HARQ-ACK bits transmitted from the subframe i. In the case of PUCCH format 1/1a/1b, h(nCQI, nHARQ, nSR)=0. In the case of PUCCH format 1b for channel selection, if a terminal is configured for more than one serving cell, h(nCQI, nHARQ, nSR)=(nHARQ-1)/2, and h(nCQI, nHARQ, nSR)=0 for other cases. For the case of PUCCH format 2/2a/2b and normal cyclic prefix, if nCQI is larger than or equal to 4, h(nCQI, nHARQ, nSR)=10 log 10(nCQI/4), and h(nCQI, nHARQ, nSR)=0, otherwise. For the case of PUCCH format 2 and extended cyclic prefix, if "nCQI+nHARQ" is larger than or equal to 4, h(nCQI, nHARQ, nSR)=10 log 10((nCQI+nHARQ)/4), and h(nCQI, nHARQ, nSR)=0 otherwise. For the case of PUCCH format 3, if a terminal is configured to transmit PUCCH through 2 antenna ports by the higher layer, or the terminal is configured to transmit 11 bits of HARQ-ACK/SR, h(nCQI, nHARQ, nSR)=(nHARQ+nSR-1)/3, and h(nCQI, nHARQ, nSR)=(nHARQ+nSR-1)/2 otherwise. $P_{O\_PUCCH}$ is a parameter formed by the sum of $P_{O\_NOMINAL\_PUCCH}$ parameter and $P_{O\_UE\_PUCCH}$ parameter provided by the higher layer.

Second, if a terminal transmits PUSCH without PUCCH through the subframe i with respect to a primary serving cell, type 2 PH is calculated by the following mathematical equation.

$$PH_{type2}(i) = P_{CMAX,c}(i) - 10\log_{10}\left(\begin{array}{l}10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{0\_PUCCH}+PL_c+g(i))/10}\end{array}\right)[dB] \quad \text{[Equation 9]}$$

Third, if a terminal transmits PUCCH without PUSCH through the subframe i with respect to a primary serving cell, type 2 PH is calculated by the following mathematical equation.

$$PH_{type2}(i) = P_{CMAX,c}(i) - 10\log_{10}\left(\begin{array}{l}10^{(P_{O\_PUCCH,c}+\alpha_c(1)\cdot PL_c+f_c(i))/10} + \\ 10^{(P_{0\_PUCCH}+PL_c+h(n_{CQI},n_{HARQ},n_{SR})+\Delta_{F\_PUCCH}(F)+\Delta_{TxD}(F')+g(i))/10}\end{array}\right)[dB] \quad \text{[Equation 10]}$$

Fourth, $\tilde{P}_{CMAX,c}(i)$ is calculated under the assumption that MPR is 0 dB, A-MPR is 0 dB, P-MPR is 0 dB, and $\Delta T_C$=0 dB.

$$PH_{type2}(i) = P_{CMAX,c}(i) - \quad \text{[Equation 11]}$$
$$10\log_{10}\left(\begin{array}{l}10^{(P_{O\_PUSCH,c}(1)+\alpha_c(1)\cdot PL_c+f_c(i))/10} + \\ 10^{(P_{0\_PUCCH}+PL_c+g(i))/10}\end{array}\right)[dB]$$

where $\tilde{P}_{CMAX,c}(i)$ is calculated under the assumption that MPR is 0 dB, A-MPR is 0 dB, P-MPR is 0 dB, and $\Delta T_C$ is 0 dB.

PH value is given in units of dB and has to be determined through rounding-off to the nearest value within a range of 40 dB to −23 dB. The determined PH value is delivered from the physical layer to the higher layer.

Meanwhile, a reported PH value corresponds to the value estimated by using one subframe.

If a terminal is not configured for extended PHR, only type 1 PH value about a primary serving cell is reported. On the other hand, if a terminal is configured for extended PHR, type 1 PH value and type 2 PH value are reported for each of activated serving cells to which uplink is established. In what follows, extended PHR will be described in detail.

PH reporting delay refers to the difference between the start time of a PH reference interval and the start time at which a terminal begins transmitting PH values through a wireless interface. Ideally, PH reporting delay has to be 0 ms, and PH reporting delay can be applied to all of the triggering methods configured for PHR.

The table below illustrates mapping of power headroom being reported.

TABLE 7

| Reported value | Measured quantity value (dB) |
|---|---|
| POWER_HEADROOM_0 | −23 ≤ PH < −22 |
| POWER_HEADROOM_1 | −22 ≤ PH < −21 |
| POWER_HEADROOM_2 | −21 ≤ PH < −20 |
| POWER_HEADROOM_3 | −20 ≤ PH < −19 |
| POWER_HEADROOM_4 | −19 ≤ PH < −18 |
| POWER_HEADROOM_5 | −18 ≤ PH < −17 |
| ... | ... |
| POWER_HEADROOM_57 | 34 ≤ PH < 35 |
| POWER_HEADROOM_58 | 35 ≤ PH < 36 |
| POWER_HEADROOM_59 | 36 ≤ PH < 37 |
| POWER_HEADROOM_60 | 37 ≤ PH < 38 |

TABLE 7-continued

| Reported value | Measured quantity value (dB) |
|---|---|
| POWER_HEADROOM_61 | 38 ≤ PH < 39 |
| POWER_HEADROOM_62 | 39 ≤ PH < 40 |
| POWER_HEADROOM_63 | PH ≥ 40 |

With reference to Table 7, PH value falls within the range from −23 dB to +40 dB. If 6 bits are used for the PH value, 64(=$2^6$) indices can be expressed; therefore, PH can be specified by a total of 64 levels. As one example, if the bit value for PH is "0" (which is "000000" in six-bit expression), it indicates that PH level is "−23≤$P_{pH}$≤−22 dB".

Meanwhile, control of PHR can be implemented through a periodic PHR timer and a prohibitPHR-Timer. By transmitting the "dl-PathlossChange" value through an RRC message, a terminal controls triggering of PHR due to change of path loss measured for downlink and change of P-MPR due to power management.

PHR can be triggered when at least one of the events below occurs.

1. In case path loss (for example, a path loss estimated by the terminal) is increased much more in at least one activated serving cell used as a path loss reference, and a prohibit-PHR-Timer expires; or the prohibitPHR-Timer expires, and path loss (dB) increases much more in at least one activated serving cell used as a path loss reference after a terminal secures uplink resources for new transmission and performs the last transmission of PHR, PHR is triggered. A terminal can measure the path loss on the basis of RSRP.

: prohibitPHR-Timer expires or has expired and the path loss has changed more than dl-PathlossChange dB for at least one activated Serving Cell which is used as a pathloss reference since the last transmission of a PHR when the UE has UL resources for new transmission;

2. In case a periodicPHR-Timer expires, PHR is triggered. Since PH changes in a random fashion, according to a periodic PHR scheme, a terminal triggers PHR when the periodicPHR-Timer expires, and if PR is reported, the terminal activates the periodicPHR-Timer again.

: periodicPHR-Timer expires;

3. In case configuration or reconfiguration related to the PHR operation except for prohibition of the PHR is performed by the higher layer such as RRC or MAC, PHR is triggered.

: upon configuration or reconfiguration of the power headroom reporting functionality by upper layers, which is not used to disable the function;

4. In case a secondary serving cell configured for uplink is activated, PHR is triggered.
: activation of an SCell with configured uplink;
5. In case a terminal secures uplink resources for new transmission, and resources are allocated for uplink transmission at the time of uplink data transmission or PUCCH transmission through uplink resources during the corresponding TTI in any of activated serving cells configured for uplink since the last transmission of a PHR, PUCCH transmission is performed in the corresponding cell, or the required power backoff (P-MPRc) due to power management since the last transmission of a PHR changes more than "dl-PathlossChange" [dB], PHR is triggered.
: prohibitPHR-Timer expires or has expired, when the UE has UL resources for new transmission, and the following is true in this TTI for any of the active Serving Cells with configured uplink:
  there are UL resources allocated for transmission or there is a PUCCH transmission on this cell, and the required power backoff due to power management (as allowed by P-MPRc) for this cell has changed more than dl-PathlossChange dB since the last transmission of a PHR when the UE had UL resources allocated for transmission or PUCCH transmission on this cell;

As one example of triggering, in case a terminal receives resources for new transmission during the corresponding TTI, the following three steps are performed.

(1) In the case of the first uplink resource allocation for new transmission since the last MAC reset, a periodicPHR-Timer is started.

(2) In case at least one PHR has been triggered since the last transmission of a PHR, or a transmitted PHR is the first triggered PHR, and allocated uplink resources provide space enough for transmitting PHR MAC control elements (including an extended PHR), the following scheme is performed.

1) If an extended PHR has been configured, it indicates that each uplink is configured. If a type 1 PH value is obtained with respect to an activated serving cell, and a terminal has received uplink resources for uplink transmission through the corresponding serving cell during the corresponding TTI, the terminal obtains a value corresponding to $P_{CMAX,c}$ field from the physical layer, generates an extended PHR MAC CEs (Extended Power Headroom Report MAC Control Elements), and transmits the generates extended PHR MAC CEs.

2) If an extended PHR has been configured, and simultaneous PUCCH-PUSCH is configured, a terminal obtains a type 2 PH value with respect to a primary serving cell. If the terminal performs PUCCH transmission during the corresponding TTI, the terminal obtains a value corresponding to the $P_{CMAX,c}$ field from the physical layer. And the terminal generates an extended PHR MAC CE and transmits the generated extended PHR MAC CE.

3) if an extended PHR has not been configured, a terminal obtains a type 1 PH value from the physical layer, generates a PHR MAC control element, and transmits the generated PHR MAC control element.

(3) A terminal starts or restarts a periodicPHR-Timer, starts or restarts a prohibitPHR-Timer, and cancels all of the triggered PHRs.

Meanwhile, an extended PHR MAC CE is checked by the LCID within a sub-header. The extended PHR MAC CE can have various sizes.

Figure 15:
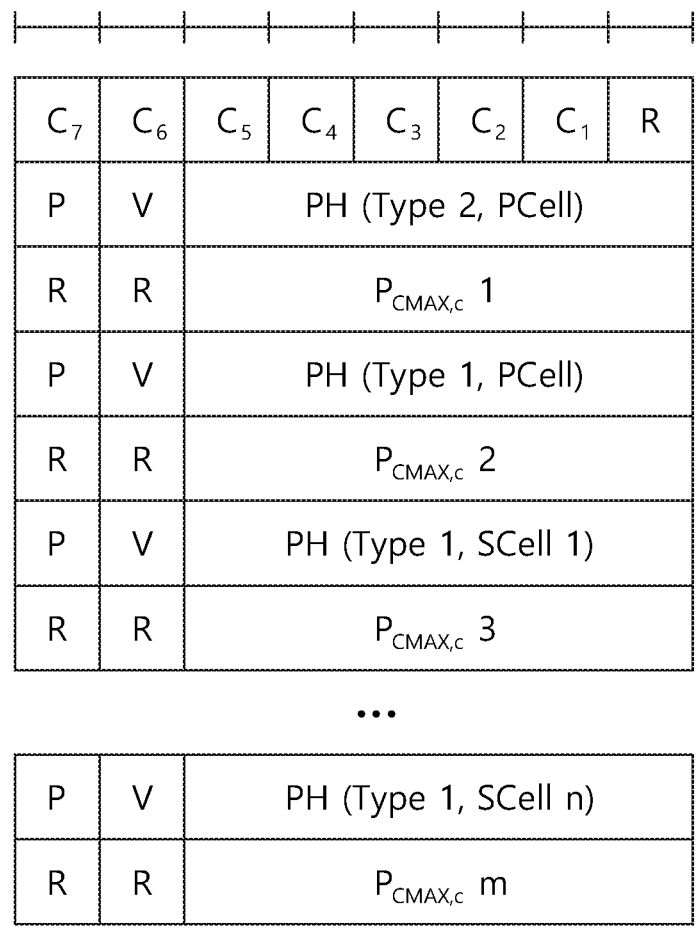
FIG. 15 illustrates one example of an extended PHR MAC CE.

FIG. 15 Illustrates One Example of an Extended PHR MAC CE.

With reference to FIG. 15, Ci field indicates the secondary serving cell index (SCellIndex) i; in the case of "1", it indicates that a PH value is reported on the corresponding SCell while, in the case of "0", a PH value is not reported on the corresponding SCell. R field is a reserved bit and set to 0.

Also, V field is an indicator indicating whether a PH value is based on actual transmission, or a PH value is related to a reference format. In the case of type 1 PHR, if V=0, it indicates that there is actual PUSCH transmission while, if V=1, it indicates that a PUSCH reference format is used. In the case of type 2 PHR, if V=0, it indicates actual PUCCH transmission while, if V=1, it indicates that a PUCCH reference format is used. If V=0 for both of the type 1 and the type 2 PHR, it indicates that $P_{CMAX,c}$ field is defined while, if V=1, it indicates that $P_{CMAX,c}$ field is not used.

PH (Power Headroom) field is related to a PH value and can comprise 6 bits.

P field indicates whether a terminal has applied power backoff due to power management (P-MRP), and P is set to 1 (P=1) in case the $P_{CMAX,c}$ field has a different value by the power backoff.

$P_{CMAX,c}$ field indicates $P_{CMAX,c}$ or $\tilde{P}_{CMAX,c}$ used for calculation of the PH field above, and this field may or may not be defined.

Table 8 below shows a nominal terminal transmission power level with respect to an extended PHR.

TABLE 8

| $P_{CMAX,c}$ | Nominal UE transmit power level |
|---|---|
| 0 | $P_{CMAX,c}\_00$ |
| 1 | $P_{CMAX,c}\_01$ |
| 2 | $P_{CMAX,c}\_02$ |
| ... | ... |
| 61 | $P_{CMAX,c}\_61$ |
| 62 | $P_{CMAX,c}\_62$ |
| 63 | $P_{CMAX,c}\_63$ |

<Disclosure of the Present Specification>

The present specification discloses a method for configuring or transmitting PHR for each cell or cell group when a User Equipment (UE) or a terminal exchanges information or channels related to control and/or data through two or more cell groups (eNodeB groups) at geographically different locations.

More specifically, a situation in which cells or cell groups at different geographic locations exchange signals or channels related to control and/or data can be taken into account in the next version of the system.

At this time, scheduling information among cells or cell groups at different geographic locations may not be shared dynamically but can be performed independently; in this case, transmission of each Uplink Control Information (UCI) to the corresponding dedicated cell can be taken into account.

In other words, transmitting UCI about a first base station (eNodeB1) to the first base station and transmitting UCI about a second base station (eNodeB2) to the second base station can be taken into account.

In this case, it can be described that dual connectivity has been established for a terminal connected to both of the first and the second base station.

In the case of dual connectivity, a terminal can be additionally connected to a small cell or a small cell base station (SeNB) simultaneously to perform data boosting with a macro base station (MeNB) responsible for RRC configuration and voice communication.

The disclosure of the present specification assumes that a macro base station (eNodeB) is set to a master cell group (MCG), and a small cell base station (eNodeB) is set to a secondary cell group (SCG).

Also, an MCG includes a PCell (Primary Cell), and an SCG includes a pSCell (Primary Small Cell) for transmitting PUCCH and the corresponding UCI to an SeNB. However, the technical principles of the present invention are not limited to an embodiment but can be extended to a situation in which information or channels related to control and/or data are exchanged with two or more cells connected through a non-ideal backhaul.

In the next version of the system, it can be taken into account that a UCI corresponding to an MCG is transmitted by a UE to an MeNB of the MCG, and a UCI corresponding to an SCG is transmitted by a UE to an SeNB.

Also, it can be configured that RRM (Radio Resource Management) such as RSRP/RSRQ is performed for all of the serving cells, and corresponding report about the result is transmitted only to the MeNB responsible for RRC configuration.

Also, in the next version of the system, it can be taken into account that a UE performs PHR (Power Headroom Reporting) for all of the serving cells and transmits measurement or calculation values with respect to all of the serving cells to both of the MeNB and SeNB.

Taking into account the fact that RRM measurement is reported only to the MeNB and the functions performed by the MeNB (RRC configuration, mobility handling, and so on), the PHR transmitted to the MeNB and SeNB by the UE can be configured differently.

More specifically, the corresponding PHR configuration information can select virtual PH irrespective of scheduling and actual PH for which PH is calculated (or calculated by taking into account actual transmission) according to the scheduling.

The present specification discloses a method for configuring a transmission target of a UE differently as an MeNB or an SeNB for configuring the PHR.

In what follows, the present specification will be described in more detail. In the first disclosure of the present specification, a method for transmitting a PHR to an MeNB is described, in the second disclosure of the present specification, a method for transmitting a PHR to an SeNB is described, in the third disclosure of the present specification, a method for configuring a virtual PH is described, in the fourth disclosure of the present specification, a method for configuring $P_{CMAX,c}$ corresponding to PHR calculation is described, in the fifth disclosure of the present specification, a method for configuring PHR in the asynchronous case is described, and in the sixth disclosure of the present specification, a method for transmitting a PHR in the case of PHR triggering is described.

<First Disclosure of the Present Specification—PHR to MeNB>

As described above, in the first disclosure of the present specification, methods for transmitting a PHR to an MeNB will be explained.

By default, a PH value is determined by the information configured by a higher layer, TPC (Transmit Power Control) informed to a user equipment through a DCI, an amount of path loss estimated by the UE, and scheduling information of the UE.

In the description above, it can be assumed that accurate information about TPC, path loss, and scheduling is not shared in a dual connectivity mode.

However, if it is taken into account that RRM measurements of all of the serving cells including an SCG are transmitted to the MeNB, the MeNB can estimate the path loss with respect to the SeNB on the basis of the RSRP corresponding to the SeNB.

In other words, in case a PH with respect to the SeNB is calculated according to actual scheduling at the time of configuring a PHR to be transmitted to the MeNB, the MeNB can estimate information about scheduling of the SeNB on the basis of a received PH and $P_{CMAX,c}$ or can perform scheduling of the MeNB or power allocation efficiently by taking into account actual PH.

A method for configuring a PHR to be transmitted to the MeNB is as follows.

1-1 Configuration Method

The 1-1 configuration method refers to the method for a UE to calculate PH according actual scheduling at the time of calculating PH with respect to an SeNB to be transmitted to an MeNB.

In the absence of scheduling, a virtual PH can be calculated by using a reference format or under the assumption that MPR=0 (refer to the Rel-11 specification, 3GPP TS 36.213, 3GPP TS 36.321)

Also, path loss related to the SeNB incurred at the time of calculating the PH can be calculated by using a recent RSRP reported to the MeNB.

1-2 Configuration Method

The 1-2 configuration method refers to the method for a UE to calculate virtual PH by using a reference format or assuming that MPR=0 irrespective of actual scheduling at the time of calculating PH with respect to an SeNB to be transmitted to an MeNB (refer to the Rel-11 specification, 3GPP TS 36.213, 3GPP TS 36.321).

Also, PH about an MCG in a PHR transmitted to the MeNB can be obtained by calculating actual PH according to actual scheduling.

<Second Disclosure of the Present Specification—PHR to SeNB>

As described above, methods for transmitting a PHR to an SeNB according to the second disclosure of the present invention will be explained.

In case an RRM measurement result of all of the serving cells including an SCG is transmitted to an MeNB, the SeNB is still unable to accurately estimate the PH value by using TPC informing the UE through a DCI with respect to the MeNB, an amount of path loss estimated by the UE, and scheduling information of the UE.

In other words, when PH is calculated by using the corresponding information, it is not possible to know whether path loss or scheduling gives the corresponding information; therefore, it may be inefficient to use actual PH with respect to the MeNB for subsequent scheduling with respect to the SeNB or power allocation with respect to a UL channel.

Therefore, in contrast to the MeNB, for the case of a PHR transmitted to the SeNB, virtual PH may be taken into account irrespective of scheduling when PH corresponding to an MCG is calculated.

The following describes a method for configuring a PHR to be transmitted to the SeNB.

2-1 Configuration Method

The 2-1 configuration method calculates virtual PH by using a reference format irrespective of actual scheduling or by assuming that MPR=0 when the UE calculates PH with respect to the MeNB to be transmitted to the SeNB (refer to the Rel-11 specification).

2-2 Configuration Method

The 2-2 configuration method calculates PH according to actual scheduling when the UE calculates PH with respect to the MeNB to be transmitted to the SeNB.

More specifically, according to the 2-2 configuration method, in the absence of scheduling, virtual PH can be calculated by using a reference format or by assuming that MPR=0 (refer to the Rel-11 specification).

Also, calculating actual PH according to actual scheduling can be taken into account for the PH with respect to an MCG in the PHR transmitted to the SeNB.

As described in the first and the second disclosure above, calculation of virtual PH can be taken into account irrespective of scheduling for the PH with respect to an SCG in the PHR transmitted to an MeNB, and calculation of actual PH can be taken into account according to scheduling for the PH with respect to an MCG in the PHR transmitted to an SeNB.

<Third Disclosure of the Present Specification—Method for Configuring Virtual PH>

As described above, methods for configuring virtual PH according to the third disclosure of the present specification will be explained.

A reference format can be configured through higher layer signaling or employ a default format assumed in the absence of higher layer signaling.

The reference format may include MCS (Modulation Coding Scheme), resource allocation, and so on; or may be determined on the basis of statistics received by a terminal through a recent uplink grant.

For example, if 20 RBs have been scheduled (statistically) through 16 QAM during a recent interval, a terminal can determine the reference format by using the scheduling.

Similarly, the reference format may be specified by using one of a plurality of reference formats according to a PHR reporting trigger condition. In this case, the reference format can be determined by the terminal or through higher layer signaling.

Also, the method for configuring a reference format described above can also be applied to a combination of an MeNB PCell and SeNB sPCell (PUCCH cell). In this case, it can be assumed that a PHR about other carriers includes actual PH or virtual PH.

In other words, virtual PH with respect to an MeNB PCell, reference format based virtual PH, or actual PH can be applied when a PHR is given to the SeNB with respect to a PCell; and virtual PH with respect to an SeNB sPCell, reference format based virtual PH, or actual PH can be applied when a PHR is given to the MeNB with respect to the PCell.

In another method, configuring each serving cell to enable configuring virtual PH, reference format based virtual PH, or actual PH may also be taken into account. The corresponding configuration can take into account the case in which an MeNB informs an SeNB through signaling.

In the description above, in case virtual PH is yet calculated in the presence of actual scheduling, it can be taken into account that the UE transmits $P_{CMAX,c}$ to the base station together when a PHR is transmitted.

<Fourth Disclosure of the Present Specification—Method for Configuring $P_{CMAX,c}$ Corresponding to Calculation of PHR>

As described above, methods for configuring $P_{CMAX,c}$ corresponding to calculation of a PHR according to a fourth disclosure of the present specification will be explained.

More specifically, the fourth disclosure of the present specification is related to a method for calculating or configuring a PHR in case both of $P_{Cmax,eNB}$(per eNB maximum power) and $P_{Cmax,c}$(per CC maximum power) are configured.

A method for configuring a PHR at the time of calculating PH corresponding to an MCG with respect to a PHR transmitted to an SeNB is described below.

3-1 Configuration Method

The 3-1 configuration method always uses $P_{Cmax,SeNB}$ (maximum transmission power to the SeNB) at the time of calculating PH corresponding to an MCG with respect to a PHR transmitted to the SeNB.

3-2 Configuration Method

The 3-2 configuration method uses the minimum value between two parameters by using min($P_{Cmax,SeNB}$ and $P_{Cmax,c}$) at the time of calculating PH corresponding to an MCG with respect to a PHR transmitted to the SeNB.

3-3 Configuration Method

The 3-3 configuration method always uses $P_{Cmax,c}$ at the time of calculating PH corresponding to an MCG with respect to a PHR transmitted to the SeNB.

3-4 Configuration Method

The 3-4 configuration method uses $P_{Cmin,MeNB}$ in case the $P_{Cmin,MeNB}$ is configured (minimum transmission power to the configured MeNB) at the time of calculating PH corresponding to an MCG with respect to a PHR transmitted to the SeNB.

3-5 Configuration Method

The 3-5 configuration method uses min($P_{Cmin,MeNB}$, $P_{Cmax,c}$) at the time of calculating PH corresponding to an MCG with respect to a PHR transmitted to the SeNB.

3-6 Configuration Method

The 3-6 configuration method uses $P_{Cmax}-P_{Cmin,SeNB}$ in case $P_{Cmin,SeNB}$ is configured (minimum transmission power to the configured MeNB) at the time of calculating PH corresponding to an MCG with respect to a PHR transmitted to the SeNB.

3-7 Configuration Method

The 3-7 configuration method uses min($P_{Cmax}-P_{Cmin,SeNB}$, $P_{Cmax,c}$) in case $P_{Cmin,SeNB}$ is configured (minimum transmission power to the configured MeNB) at the time of calculating PH corresponding to an MCG with respect to a PHR transmitted to the SeNB.

Also, described below is a method for configuring a PHR at the time of calculating PH corresponding to an SCG with respect to a PHR transmitted to an MeNB.

4-1 Configuration Method

The 4-1 configuration method always use $P_{Cmax,MeNB}$ (maximum transmission power to the MeNB) at the time of calculating PH corresponding to an SCG with respect to a PHR transmitted to the MeNB.

4-2 Configuration Method

The 4-2 configuration method uses the minimum value of obtained parameters by using min($P_{Cmax,MeNB}$ and $P_{Cmax,c}$) at the time of calculating PH corresponding to an SCG with respect to a PHR transmitted to the MeNB.

4-3 Configuration Method

The 4-3 configuration method always uses $P_{Cmax,c}$ at the time of calculating PH corresponding to an SCG with respect to a PHR transmitted to the MeNB.

4-4 Configuration Method

The 4-4 configuration method uses $P_{Cmax}-P_{Cmin,MeNB}$ in case $P_{Cmin,MeNB}$ is configured (minimum transmission power to the configured MeNB) at the time of calculating PH corresponding to an SCG with respect to a PHR transmitted to the MeNB.

4-5 Configuration Method

The 4-5 configuration method uses $\min(P_{Cmax} - P_{Cmin,MeNB}, P_{Cmax,c})$ at the time of calculating PH corresponding to an SCG with respect to a PHR transmitted to the MeNB.

4-6 Configuration Method

The 4-6 configuration method uses $P_{Cmin,SeNB}$ in case $P_{Cmin,SeNB}$ is configured at the time of calculating PH corresponding to an SCG with respect to a PHR transmitted to the MeNB.

4-7 Configuration Method

The 4-7 configuration method uses $\min(P_{Cmin,SeNB}, P_{Cmax,c})$ in case • . . . , . . . is configured at the time of calculating PH corresponding to an SCG with respect to a PHR transmitted to the MeNB.

In the description above, it can be assumed for virtual PH that MPR=0 dB, A-MPR=0 dB, P-MPR=0 dB, and Δ•.=0 dB.

Also, in case a PHR with respect to activated serving cells belonging to a different cell group (CG) not corresponding to a PHT transmission target is configured in terms of dual connectivity, if virtual PH is calculated with respect to a reference format, it can be taken into account that actual values are used for calculation without assuming that MPR=0 dB, A-MPR=0 dB, P-MPR=0 dB, and Δ•.=0 dB in the presence of actual scheduling; and • . . . , . (or the value or parameter selected in the fourth disclosure of the present specification) used for the calculation is sent at the time of PHR transmission.

In the description above, in case the value referenced for the calculation of PH does not change from the assumption that MPR=0 dB, A-MPR=0 dB, P-MPR=0 dB, and Δ•.=0 dB (for example, the value can be PCmax, xeNB or PCmin, xeNB) the value referenced at the time of calculating PH (which can be PCmax, xeNB or PCmin, xeNB) may not be transmitted when actual PH value is transmitted even if the MPR is changed according to actual scheduling information. This can be possible because in this case, a base station knows the corresponding value. The method described above can be applied only for the case in which a value referenced at the time of calculating PH is smaller than PCMAX,c or smaller than a threshold value (for example, 2 dB) predetermined by the higher layer.

<Fifth Disclosure of the Present Specification—PHR Configuration with Respect to Asynchronous Case>

As described above, methods for configuring a PHR with respect to an asynchronous case according to the fifth disclosure of the present specification will be explained.

An MeNB and an SeNB can be asynchronous in dual connectivity mode, and in this case scheduling information, Pcmax, an Pcmax,c values can be varied for each overlapping part. Therefore, calculation of PHR (in particular, in the case of actual PH information) can also be varied.

In this case, PH about a different base station can take into account calculating a PHR with respect to the overlapping part succeeding in time with respect to the base station which is a transmission target.

As one example, in case subframe i of an MeNB overlaps with subframe k and subframe k+1 of an SeNB, the PHR to be transmitted from the subframe i of the MeNB can be calculated with respect to the overlapping part between the subframe i of the MeNB and the subframe k+1 of the SeNB.

Similarly, taking into account the processing time, the PHR can be calculated with respect to the overlapping part preceding in time with respect to the base station which is a transmission target.

The methods proposed above (determination of a reference for calculating PH, configuration of the maximum transmission power (Pcmax) used for calculation of PHR, and reference timing) can be utilized in a combination thereof.

As one example, when PH of the MeNB transmitted to the SeNB is calculated, virtual PH can be calculated, PHR can always include Pcmax,c, and timing referenced when actual PH is calculated can be determined with respect to the portion of the overlapping part that comes later.

<Sixth Disclosure of the Present Specification—Method for Transmitting a PHR at the Time of PHR Triggering>

As described above, methods for transmitting a PHR at the time of PHR triggering according to the sixth disclosure of the present specification will be explained.

A method for transmitting a PHR according to the sixth disclosure of the present specification is used for a terminal in dual connectivity with an MCG (Master Cell Group) and an SCG (Secondary Cell Group) in a wireless communication system to transmit a PHR (Power Headroom Report), the method comprising triggering a PHR with respect to a serving cell belonging to the MCG on the basis of a PHR triggering condition and in case the PHR is triggered, transmitting the PHR to a serving cell belonging to the MCG.

At this time, the PHR can include PH (Power Headroom) information corresponding to an activated serving cell belonging to the SCG.

Also, PH information corresponding to an activated serving cell belonging to the SCG can be either virtual PH information or actual PH information determined on the basis of scheduling information of the terminal.

Also, the virtual PH information can be calculated on the basis of a predetermined reference format.

Also, the PHR triggering condition can include a first PHR triggering condition and a second PHR triggering condition, wherein the first PHR triggering condition specifies the case in which the "prohibitPHR-Timer" is expired or has expired; the case in which a terminal secures uplink resources for new transmission; the case in which any one of activated serving cells configured for uplink has resources for uplink transmission, or PUCCH transmission exists in the corresponding cell after uplink data transmission through the uplink resources in the corresponding TTI or after the last PHT transmission is performed at the time of PUCCH transmission; and the case in which the change of power backoff request value (P-MPRc: Power Management Maximum Power Reduction) is larger than the "dl-Pathloss-Change" [dB] value after the last PHR transmission.

Also, the second PHR triggering condition can include the case in which the "prohibitPHT-Timer" is expired or has expired; the case in which a terminal has secures uplink resources for new transmission; and the case in which the path loss after the last PHR transmission has been performed is larger than the "dl-PathlossChange" [dB] value about at least one activated serving cell used as the path loss reference.

Also, the PHT information corresponding to an activated serving cell belonging to the SCG can be the virtual PH information in case the PHR is triggered according to the first PHR triggering condition.

Also, the virtual PH information can be transmitted together with PCMAX,c which is the maximum transmission power for a terminal with respect to a serving cell c for which P-MPRc has been applied. In this case, the V field value of the PHR MAC can be set to 0.

Also, in case the PH information corresponding to an activated serving cell belonging to the SCG is set to the virtual PH information, the first PHR triggering condition can be ignored.

Also, in case the PH information corresponding to an activated serving cell belonging to the SCG is set to the virtual PH information, the second PHR triggering condition can be satisfied even if the terminal has not secured uplink resources for new transmission.

Also, whether the PHR is triggered according to the first PHR condition can be determined through higher layer signaling.

Also, a method according to the sixth disclosure of the present specification is used for a terminal in dual connectivity with a first and a second cell group in a wireless communication system to transmit a PHR (Power Headroom Report) through the first cell group, the method comprising receiving configuration information of PH (Power Headroom) corresponding to an activated serving cell belonging to the second cell group; in case a PHR triggering condition is satisfied, generating the PHR and transmitting the generated PHR to a serving cell belonging to the first cell group, wherein the PHR is configured to include one of virtual PH information about an activated serving cell belonging to the second cell group determined on the basis of configuration information of the received PH and actual PH information determined on the basis of scheduling information of the terminal.

At this time, the first cell group is an MCG (Master Cell Group), and the second cell group is an SCG (Secondary Cell Group).

Also, the PHR triggering condition can include the first and the second PHR triggering condition described above.

Also, the PHR can include the virtual PH information in case the PHR is triggered according to the first PHR triggering condition.

Also, in case the PHR is configured to include the virtual PH information, the first PHR triggering condition can be ignored.

Also, in case the PHR is configured to include the virtual PH information, the second PHR triggering condition can be satisfied even when the terminal has not secured uplink resources for new transmission.

Figure 16:
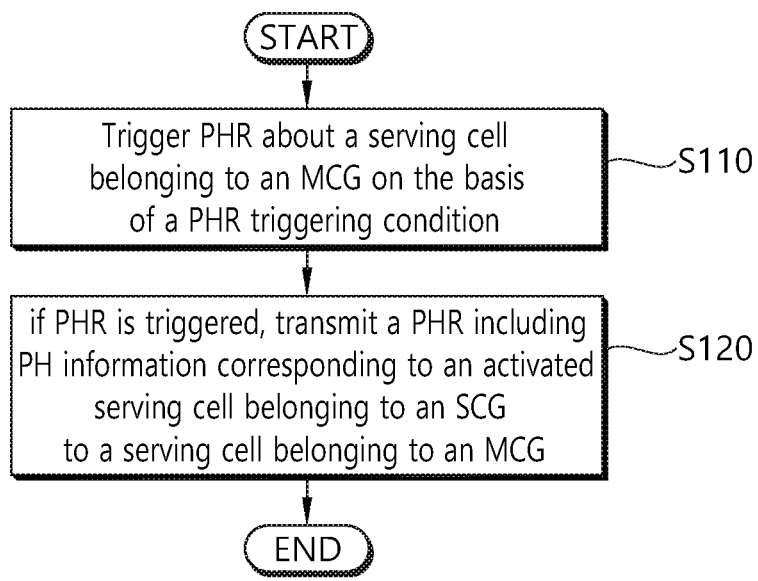
FIG. 16 is a flow diagram illustrating a PHR transmission method according to one disclosure of the present specification.

FIG. 16 is a Flow Diagram Illustrating a PHR Transmission Method According to One Disclosure of the Present Specification.

According to FIG. 16, a PHR transmission method according to one disclosure of the present specification comprises the following steps.

First, a terminal according to one disclosure of the present specification can transmit a PHR (Power Headroom Report) in a state of dual connectivity with an MCG (Master Cell Group) and an SCG (Secondary Cell Group) in a wireless communication system and trigger the PHR about a serving cell belonging to the MCG on the basis of a PHR triggering condition S110.

Also, the terminal can transmit a PHR including PH information corresponding to an activated serving cell belonging to an SCG to a serving cell belonging to an MCG.

At this time, the PH information corresponding to an activated serving cell belonging to the SCG can be virtual PH information or actual PH information determined on the basis of scheduling information of the terminal.

In what follows, a PHR transmission method according to the sixth disclosure of the present specification will be described in detail.

In the next version of the system, when a PHR is transmitted in the dual connectivity state, actual PH can be transmitted to an activated serving cell corresponding to another cell group rather than the cell group (CG) corresponding to a target cell for transmission, virtual PH can be transmitted, or either of the actual and virtual PH can be transmitted after being selected through higher layer signaling. The existing 3GPP Rel-11 specification gives the conditions for triggering a PHR as described below.

(1) The case in which "prohibitPHR-Timer" expires or has expired; and the path loss has changed more than dl-PathlossChange dB for at least one activated Serving Cell which is used as a pathloss reference since the last transmission of a PHR when the UE has UL resources for new transmission.

: prohibitPHR-Timer expires or has expired and the path loss has changed more than dl-PathlossChange dB for at least one activated Serving Cell which is used as a pathloss reference since the last transmission of a PHR when the UE has UL resources for new transmission;

(2) The case in which a periodic timer expires
: periodicPHR-Timer expires.

(3) The case in which configuration or reconfiguration related to the PHR operation except for prohibition of the PHR is performed by the higher layer such as RRC or MAC.
: upon configuration or reconfiguration of the power headroom reporting functionality by upper layers, which is not used to disable the function;

(4) The case in which a secondary serving cell configured for uplink is activated.
: activation of an SCell with configured uplink;

(5) The case in which "prohibitPHR-Timer" expires or has expired; a terminal secures uplink resources for new transmission; and resources are allocated for uplink transmission at the time of uplink data transmission or PUCCH transmission through uplink resources during the corresponding TTI in any of activated serving cells configured for uplink since the last transmission of a PHR, PUCCH transmission is performed in the corresponding cell, or the required power backoff (P-MPRc) due to power management since the last transmission of a PHR changes more than "dl-PathlossChange" [dB].
: prohibitPHR-Timer expires or has expired, when the UE has UL resources for new transmission, and the following is true in this TTI for any of the actived Serving Cells with configured uplink:
there are UL resources allocated for transmission or there is a PUCCH transmission on this cell, and the required power backoff due to power management (as allowed by P-MPRc) for this cell has changed more than dl-PathlossChange dB since the last transmission of a PHR when the UE had UL resources allocated for transmission or PUCCH transmission on this cell;

Under the conditions above, in case P-MPRc changes more than a predetermined value, and PUSCH is used for new transmission, a PHR could be transmitted to a base station by reflecting PCMAC,c changed according to the P-MPRc through type 1 PH while in the presence of PUCCH transmission, a PHR could be transmitted to a base station by reflecting PCMAC,c changed according to the P-MPRc through type 2 PH. Also, in the aforementioned case, the PCMAC,c calculated by using the P-MPRc has also been transmitted by being included in the PHR.

However, in the case of dual connectivity, virtual PH can be configured for activated serving cells corresponding to another cell group rather than a target cell group for PHR transmission, and in this case, PCMAC,c (or a value or a parameter configured in the fourth disclosure of the present specification) is calculated by assuming that P-MPRc is 0 dB, and the corresponding PCMAC,c may not be transmitted.

In this case, PHR triggering according to the change of P-MPRc is inefficient, and it is needed that PHR triggering is changed accordingly.

As one example, suppose a PHR is transmitted to an MCG serving cell. In case virtual PH is configured for an SCG when an SCG serving cell satisfies the condition (5), the information about the change of the P-MPRc may not be transmitted to a base station.

In case the condition (1) is applied to serving cells of a different cell group, and virtual PH is configured for the different cell group, the phrase "when the UE has UL resources for new transmission" can be ignored.

Next, in case virtual PH is configured for activated serving cells belonging to a different cell group rather than a cell group corresponding to the cell to which a PHR is transmitted, a method for configuring PHR triggering according to the condition (5) can be implemented as follows.

5-1 Configuration Method.

The 5-1 configuration method configures virtual PH when the corresponding UE prepares a PHR about activated serving cells belonging to a different cell group with respect to the condition (5).

5-2 Configuration Method

The 5-2 configuration method ignores the condition (5) in case a PHR is configured by virtual PH with respect to activated serving cells belonging to a different cell group.

In addition, the condition (1) may be ignored. Or in the case of the condition (1), a PHR can be transmitted even when the phrase "UE has UL resources for new transmission" is not true.

5-3 Configuration Method

The 5-3 configuration method calculates actual PH even when the corresponding UE prepares a PHR about activated serving cells belonging to a different cell group with respect to the condition (5) by using virtual PH.

5-4 Configuration Method

The 5-4 configuration method is used for the corresponding UE to compose or configure a PHR by using virtual PH about activated serving cells belonging to a different cell group with respect to the condition (5).

In addition, the PCMAC,c value reflecting the P-MPRc can be transmitted together with virtual PH. At this time, the field V comprising the PHR can be set to 0.

More specifically, in this case, a reference format is assumed for calculating virtual PH, but an actual MPR value can be used for calculating the PCMAC,c value (or parameter values according to the fourth disclosure of the present specification).

5-5 Configuration Method

The 5-5 configuration method configures or determines whether to apply the condition (5) through the higher layer.

5-6 Configuration Method

The 5-6 configuration method configures the operation of the UE according to the condition (5) through the higher layer.

More specifically, in case the virtual PH is calculated, and a different parameter (for example, parameters according to the fourth disclosure of the present specification) rather than the PCMAC,c is used, if the corresponding parameter does not take into account P-MPRc, the condition (5) can be ignored. As one example, in case min(PCmin, SeNB, PCmax,c) is utilized for calculating virtual PH, and PCmin, SeNB is smaller than PCmax,c, then the UE can ignore the condition (5).

<Additional Disclosure of the Present Specification—Network Operation with PHR in Dual Connectivity>

In what follows, a network operation about a PHR in dual connectivity according to additional disclosure of the present specification will be described.

As described above, a UE can be configured so that a network can always load virtual PH or actual PH on a carrier belonging to a different cell group.

In this situation, one base station can adjust its scheduling by using PH about the carrier corresponding to a different cell group and also use the PH for power control coordination between an MeNB and an SeNB. More specifically, the following cases can be taken into account.

The Case in which Virtual PH is Always Configured for a Carrier of a Different Cell Group In case positive PH is loaded on carrier 1, the corresponding base station does not know how a different base station is scheduled, and therefore it is difficult to figure out utilization of power.

According to additional disclosure of the present specification, in case the MeNB configures the maximum power of the SeNB, or the maximum power about the carrier possessed by the SeNB is adjusted through $PE_{MAX}$, if PH is smaller than a predetermined threshold by taking into account the scheduling of the SeNB with respect to the positive PH, $PE_{MAX}$ is enlarged.

In this case, determining that path loss with respect to the SeNB has increased or the situation requires more allocation of power, PCmax,c with respect to the SeNB carrier can be adjusted through $PE_{MAX}$ or through new inter-node RRC signaling.

This indicates that the $PE_{MAX}$ about the corresponding carrier is reconfigured for the terminal, and MeNB can transmit new $PE_{MAX}$ to the SeNB. Also, the SeNB may check its PH and request new $PE_{MAX}$ from the MeNB.

In case negative PH is loaded on the first carrier, and no particular operation is performed, negative PH without PUSCH scheduling information indicates that accumulated power has approached or exceeded PCmax,c; thus it can be taken into account that there is no scheduling about the first carrier for a while. Therefore, it can be assumed that the power used for the first carrier can be directed to a different carrier. For example, in case the terminal is capable of performing look-ahead based operation, 20% of the maximum power of the terminal is reserved for each cell group such that P_MeNB=20%, P_SeNB=20%, and negative PH is loaded on a carrier with respect to the SeNB, the MeNB can assume that the SeNB is not going to perform scheduling for a while because of power shortage.

In this case, assuming that P_SeNB of 20% can be used from the MCG, the MeNB can perform aggressive scheduling. Also, in case negative PH is loaded with respect to a terminal, it can be assumed that reliable transmission is not possible due to power shortage; therefore, in the event of power limited case, a carrier loaded with negative PH can be dropped first.

If negative PH is loaded on its carrier, the SeNB can request the MeNB to increase PCmax,c.

If $PE_{MAX}$ is configured as cell-common according to the maximum coverage that can be supported by one cell, and negative PH is loaded continuously, the MeNB can interpret that the corresponding carrier lacks uplink coverage.

Therefore, if negative PH (virtual PH) is loaded continuously on a carrier of an SCG, the corresponding carrier can be released. Also, if virtual PH is negative for this situation, the terminal can trigger a PHR.

The Case in which Actual PH is Configured for a Carrier Belonging to a Different Cell Group If positive PH is loaded on a first carrier, power utilization may not be easily figure out since the corresponding base station does not know scheduling of other base stations.

However, if statistical scheduling information can be exchanged through backhaul signaling, it can be helpful. Moreover, if a different base station is currently increasing power, or increasing accuracy of scheduling (therefore, information that PH value is going to be decreased gradually), the corresponding fact can be informed through backhaul signaling.

If a different base station is increasing power, the corresponding base station can adjust aggressiveness of scheduling so that the terminal can avoid a power restriction case.

If it is anticipated that PH is going to be increased gradually, more aggressive scheduling can be performed in the opposite situation. To this purpose, the additional disclosure of the present specification proposes substituting aggressiveness with backhaul. Or BSR (Buffer Status Report) information can be exchanged periodically. Since a BSR can inform of the degree of scheduling to be applied afterwards, how much power is available can be determined according to the BSR.

Also, in case negative PH is loaded on the first carrier, scheduling of the corresponding base station is expected to reduce the amount of scheduling to lower requested power.

However, since transmission power does not deviate largely from •..., ., in this case a base station can configure its power by assuming that a different base station is using the maximum power.

In the case of an MeNB, if it is required to allocate little power to the SeNB, MeNB can reconfigure power by lowering the PCmax,c (PEMAX reconfiguration).

To achieve effective operation as described above, an additional disclosure of the present specification proposes that each base station is enabled to configure PH reporting type (always virtual PH or actual PH) of a different base station group. In other words, the MeNB can configure an SeNB carrier to have actual PH, and the SeNB can configure an MeNB carrier to always have virtual PH. Also, each carrier can be further configured to have actual PH or virtual PH.

The additional disclosure of the present specification proposes exchanging the following information between base stations to achieve effective operation.

(1) Traffic condition statistics, for example, coherent time: indicates how long a traffic condition is maintained.

Configuration of virtual PH may always be disabled.

(2) Aggressive scheduling indicator: it indicates whether to change scheduling information (whether to increase the amount of data) to use all of the corresponding power in case actual PH is positive.

(3) Power statistics per each base station or activated serving cell (actual power or requested power)

(4) Packet information of the corresponding transmission (the whole size, the amount of transmitted data, the amount of remaining data, drop rate, BER (Bit Error Rate), FER (Frame Error Rate), and so on)

(5) Statistics about scheduling information: RB allocation (the number of RBs, RB form, and so on), modulation, and transmission (Tx) scheme.

(6) Path loss statistics can include path loss coherent time.

Figure 17:
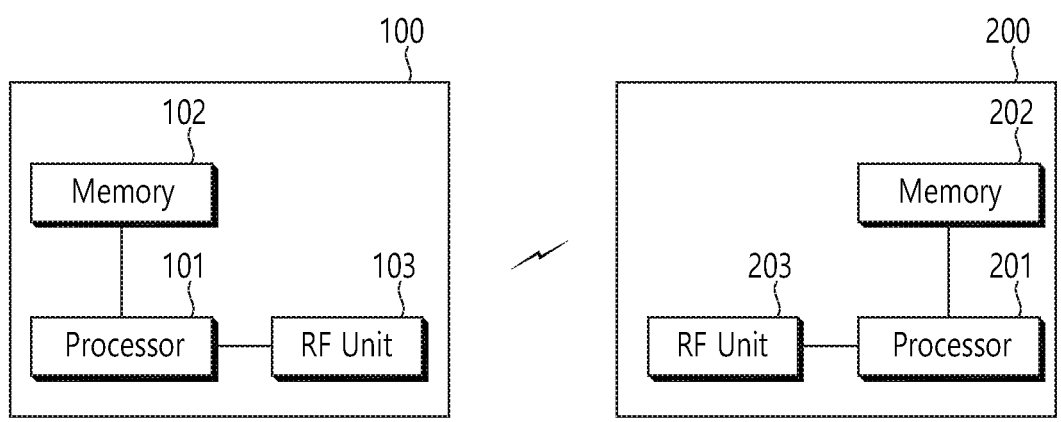
FIG. 17 is a block diagram illustrating a wireless communication system in which the disclosure of the present specification is implemented.

FIG. 17 is a Block Diagram Illustrating a Wireless Communication System in which the Disclosure of the Present Specification is Implemented.

A base station 200 includes a processor 201, memory 202, and RF (Radio Frequency) unit 203. The memory 202, being connected to the processor 201, stores varies types of information required for driving the processor 201. The RF unit 203, being connected to the processor 201, transmits and/or receives a radio signal. The processor 201 implements a proposed function, process, and/or method. In the embodiment described above, the operation of a base station can be realized by the processor 201.

A terminal includes a processor 101, memory 102, and RF unit 103. The memory 102, being connected to the processor 101, stores varies types of information required for driving the processor 101. The RF unit 103, being connected to the processor 101, transmits and/or receives a radio signal. The processor 101 implements a proposed function, process, and/or method.

The processor can include ASIC (Application-Specific Integrated Circuit), other chipsets, logical circuit and/or data processing apparatus. The memory can include ROM (Read-Only Memory), RAM (Random Access Memory), flash memory, memory card, storage medium and/or other storage apparatus. The RF unit can include a baseband circuit for processing a radio signal. In case embodiments are implemented by software, the methods described above can be implemented in the form of modules (processes or functions) performing the functions described above. A module is stored in the memory and can be executed by the processor. The memory can be installed inside or outside the processor and can be connected to the processor through various well-known means.

A terminal according to one disclosure of the present specification transmits PHR (Power Headroom Report) with dual connectivity to an MCG (Master Cell Group) and SCG (Secondary Cell Group) in a wireless communication system according to the disclosure of the present specification comprises an RF unit; and a processor triggering PHR about a serving cell belonging to the MCG according to PHR triggering conditions and in case the PHR is triggered, controlling the RF unit to transmit the PHR to the serving cell belonging to the MCG, wherein the PHR includes PH (Power Headroom) information corresponding to an activated serving cell belonging to the SCG, and PH information corresponding to the activated serving cell belonging to the SCG is either virtual PH information or actual PH information determined on the basis of scheduling information of the terminal.

Also, the virtual PH information can be calculated on the basis of a predetermined reference format.

Also, the PHR triggering condition can include a first PHR triggering condition and a second PHR triggering condition, wherein the first PHR triggering condition specifies the case in which the "prohibitPHR-Timer" is expired or has expired; the case in which a terminal secures uplink resources for new transmission; the case in which any one of activated serving cells configured for uplink has resources for uplink transmission, or PUCCH transmission exists in the corresponding cell after uplink data transmission through the uplink resources in the corresponding TTI or after the last PHT transmission is performed at the time of PUCCH transmission; and the case in which the change of power backoff request value (P-MPRc: Power Management Maximum Power Reduction) is larger than the "dl-Pathloss-Change" [dB] value after the last PHR transmission. The second PHR triggering condition can include the case in which the "prohibitPHT-Timer" is expired or has expired; the case in which a terminal has secures uplink resources for new transmission; and the case in which the path loss after the last PHR transmission has been performed is larger than the "dl-PathlossChange" [dB] value about at least one activated serving cell used as the path loss reference.

Also, PH information corresponding to an activated serving cell belonging to the SCG can be configured to have the virtual PH information in case the PHR is triggered according to the first PHR triggering condition.

Also, in case PH information corresponding to an activated serving cell belonging to the SCG is configured to include the virtual PH information, the first PHR triggering condition can be ignored.

Also, in case PH information corresponding to an activated serving cell belonging to the SCG is configured to include the virtual PH information, the second PHR triggering condition can be satisfied even when a terminal has not secured uplink resources for new transmission.

Also a terminal according to one disclosure of the present specification has dual connectivity to a first and a second cell group and transmits PHR (Power Headroom Report) through the first cell group, the terminal comprising an RF unit receiving configuration information of PH (Power Headroom) corresponding to an activated serving cell belonging to the second cell group; and a processor controlling the RF unit to generate the PHR and transmit the generated PHR to a serving cell belonging to the first cell group in case conditions for triggering PHR are satisfied, wherein the PHR can be configured to include any one of virtual PH information about an activated serving cell belonging to the second cell group based on configuration information of the received PH and actual PH information determined on the basis of scheduling information of the terminal.

At this time, the first cell group can be an MCG (Master Cell Group), and the second cell group can be an SCG (Secondary Cell Group).

According to the disclosure of the present specification, a PHR can be configured in the dual connectivity state, and transmission can be configured efficiently.

More specifically, according to the disclosure of the present specification, a terminal in the dual connectivity state can perform PHR transmission efficiently by applying virtual PH information according to scheduling and a PHR triggering condition.

According to the disclosure of the present specification, the aforementioned problem in the prior art can be solved. More specifically, according to the disclosure of the present specification, a terminal with dual connectivity can perform PHR transmission efficiently by applying virtual PH information according to scheduling and PHR triggering conditions.

In the system described above, methods have been described on the basis of a flow diagram by using a series of steps or blocks; however, the present invention is not limited to the specific order of steps, and some of the steps can be performed in a different order from the description or performed simultaneously. Also, it should be clearly understood by those skilled in the art that the steps shown in the flow diagram are not exclusive to each other, but different steps can be included therein, or one or more steps in the flow diagram can be removed without affecting the technical scope of the present invention.

What is claimed is:

1. A method for transmitting a power headroom report (PHR), the method performed by a terminal and comprising:
   determining, by the terminal with dual connectivity to two cell groups including a first cell group and a second cell group, a power headroom (PH), based on first information, wherein the first information is used for computing the PH;
   generating the PHR including the PH,
   transmitting the generated PHR to the first cell group among the two cell groups,
   wherein the PH is computed based on an assumption that a physical uplink shared channel (PUSCH) and a physical uplink control channel (PUCCH) are not transmitted, and
   wherein based on that a first transmission time duration for the first cell group overlaps a second transmission time duration for the second cell group, the PH is computed for an overlapped portion between the first transmission time duration and the second transmission time duration.

2. The method of claim 1, wherein the first cell group is a master cell group (MCG) and the second cell group is a secondary cell group (SCG).

3. The method of claim 1, wherein when a condition for triggering the PHR is satisfied, the PHR is generated and transmitted to a serving cell belonging to the first cell group.

4. A terminal for transmitting a power headroom report (PHR), the terminal comprising:
   a transceiver configured to establish a dual connectivity to two cell groups including a first cell group and a second cell group; and
   a processor configured to control the transceiver and to perform:
   determining a power headroom (PH), based on first information, wherein the first information is used for computing the PH;
   generating the PHR including the PH,
   transmitting the generated PHR to the first cell group among the two cell groups,
   wherein the PH is computed based on an assumption that a physical uplink shared channel (PUSCH) and a physical uplink control channel (PUCCH) are not transmitted, and
   wherein based on that a first transmission time duration for the first cell group overlaps a second transmission time duration for the second cell group, the PH is computed for an overlapped portion between the first transmission time duration and the second transmission time duration.

5. The terminal of claim 4, wherein the first cell group is a master cell group (MCG) and the second cell group is a secondary cell group (SCG).

6. The terminal of claim 4, wherein when a condition for triggering the PHR is satisfied, the PHR is generated and transmitted to a serving cell belonging to the first cell group.

* * * * *